(12) United States Patent
Lombardi

(10) Patent No.: US 9,676,964 B1
(45) Date of Patent: Jun. 13, 2017

(54) VISIBLE LIGHT ACTIVATED AQUEOUS BASED SELF-DECONTAMINATING COATING COMPOSITION

(71) Applicant: John L. Lombardi, Tucson, AZ (US)

(72) Inventor: John L. Lombardi, Tucson, AZ (US)

( * ) Notice: Subject to any disclaimer, the term of this patent is extended or adjusted under 35 U.S.C. 154(b) by 185 days.

(21) Appl. No.: 14/521,376

(22) Filed: Oct. 22, 2014

Related U.S. Application Data

(60) Provisional application No. 61/894,053, filed on Oct. 22, 2013.

(51) Int. Cl.
*C09D 183/04* (2006.01)
*C09D 179/02* (2006.01)

(52) U.S. Cl.
CPC .......... *C09D 183/04* (2013.01); *C09D 179/02* (2013.01)

(58) Field of Classification Search
CPC ........ C09D 5/156; C09D 5/16; C09D 5/1606; C09D 183/04; C09D 179/02
USPC ................................................ 521/125, 126
See application file for complete search history.

(56) References Cited

U.S. PATENT DOCUMENTS

| | | | | |
|---|---|---|---|---|
| 7,776,954 B2 * | 8/2010 | Stratton | ............... | C09D 5/1687 524/445 |
| 8,475,581 B2 * | 7/2013 | Stratton | ............... | C09D 5/1618 106/287.11 |
| 8,840,718 B2 * | 9/2014 | Stratton | ................ | B82Y 30/00 106/436 |
| 2007/0155622 A1 * | 7/2007 | Goodwin | ................ | C03C 1/008 502/242 |
| 2008/0003367 A1 * | 1/2008 | Stratton | ................ | B01J 35/004 427/372.2 |

\* cited by examiner

*Primary Examiner* — Sanza McClendon
(74) *Attorney, Agent, or Firm* — Dale F. Regelman; Grossman, Tucker, Perreault & Pfleger, PLLC

(57) ABSTRACT

A coating composition which includes a photocatalyst to generate singlet oxygen when exposed to ambient oxygen and light, an emulsifier comprising a polyethylene oxide repeat unit, an organosilane binder, and a calcium salt.

12 Claims, 21 Drawing Sheets

CEES Control

Final AlPc conc. 0.01 wt%, A-187 6 wt%, no Ca(OAc)$_2$

Final AlPc conc. 0.02 wt%, A-187 6 wt%, 1 wt% Ca(OAc)$_2$

Final AlPc conc. 0.02 wt%, A-187 6 wt%, 2 wt% Ca(OAc)$_2$ 5g 0.1 wt% AlPc in H$_2$O (containing triton-x) + 0.6 g A-187 + 0.1 g Zn(OAc)$_2$ diluted w/ H$_2$O to 10 g. Final AlPc conc. 0.05 wt%

Typical CEES Decontamination GC/MS Results using Isopropanol Solvent Based AlPc Photosensitizer Coating Typical CEES Decontamination GC/MS Results using Isopropanol Solvent Based AlPc Photosensitizer Coating Coated Spunbond Typical CEES Decontamination GC/MS Results using Isopropanol Solvent Based AlPc Photosensitizer Coating Coated Spunbond

EXAMPLE 12

EXAMPLE 13

EXAMPLE 14

EXAMPLE 15

EXAMPLE 16

EXAMPLE 17

VISIBLE LIGHT ACTIVATED AQUEOUS BASED SELF-DECONTAMINATING COATING COMPOSITION

CROSS REFERENCE TO RELATED APPLICATIONS

This Non-Provisional Application claims priority to a U.S. Provisional Application having Ser. No. 61/894,053 filed Oct. 22, 2013.

FIELD OF THE INVENTION

In certain embodiments, the invention is directed to solvent and waterborne self-decontaminating coatings which generate singlet oxygen from visible light and air. In certain embodiments, the coatings comprise a mild oxidant that decontaminates fabrics exposed to toxic chemicals and biological warfare agents.

In certain embodiments, the invention is directed to non-light activated polymer coatings that sanitize and disinfect surfaces exposed to bacteria, viruses, mold, and spores.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF PREFERRED EMBODIMENTS

Figure 1:
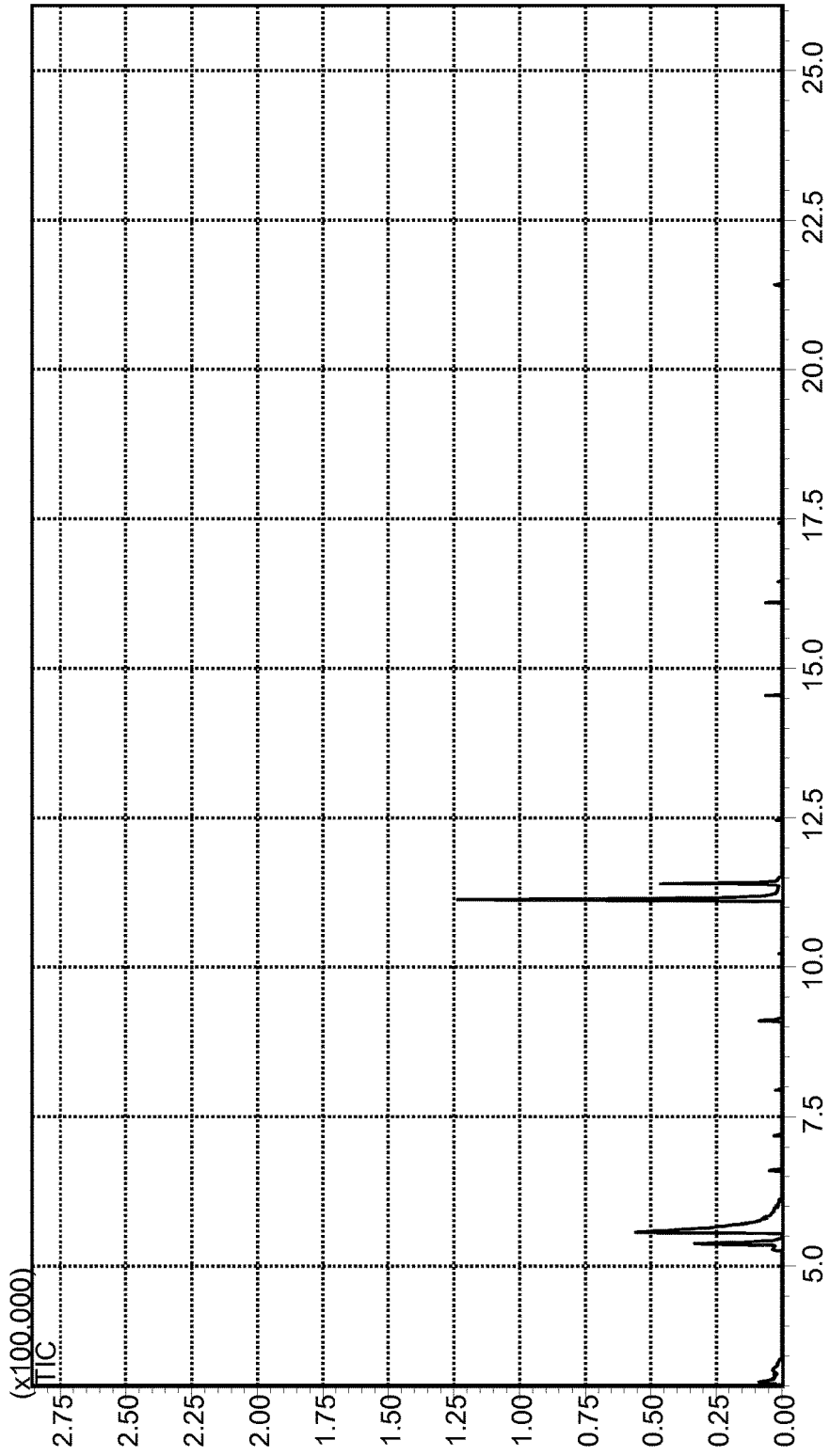
FIG. 1 recites GC MS results from CEES Challenge Upon PROVENT Fabric Coated With Aqueous Self-Decontaminating Formulation.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Disclosed are for self-decontaminating coatings which continuously generate singlet oxygen upon exposure to visible light and oxygen. When applied to hard or soft surfaces, these coatings exhibit remarkable capacity to detoxify toxic chemicals (e.g. HD Mustard Chemical Warfare Agent simulant) which come in contact with the treated surfaces.

Applicant's coatings can be applied to a wide variety of substrates including masonry, polymeric materials, ferrous and nonferrous metals, glass, and wood.

Besides exhibiting remarkable decontamination and surface reactivity, these coatings also offer the ancillary benefit that their vehicle is predominantly water based posing fewer handling and application concerns compared to solvent borne coatings.

In certain embodiments, Applicant's composition centers around the emulsification of an Aluminum Phthalocyanine (AlPc) photocatalyst using a combination of nonylphenol ethoxylate (e.g. Dow Triton X-100) surfactant and a soluble calcium salt. In other embodiments, Applicant's composition comprises additional and/or differing singlet oxygen generating photocatalysts. In certain embodiments, such differing singlet oxygen generating photocatalysts are selected from the group consisting of other phthalocyanines (e.g. silicon, zinc, un-metalated phthalocyanine), napthalocyanines, fullerenes, Azure A, Methylene Blue, Doped and Un-doped titanium dioxide.

In each of the above-described embodiments, there is interaction(s) between a calcium cation and the ethoxylated portion of the surfactant. In certain embodiments, the ethoxylated portion of the surfactant adopts a configuration to maximally solvate the calcium cation, i.e. emulating a crown ether type interaction between the ether oxygens and a calcium cation. The calcium ion complexes with a plurality of ethylene oxide repeat units, thereby stabilizing surfactant self-assembly and emulsification of highly a hydrophobic photocatalyst.

In certain embodiments, one or more other and/or differing ethoxylated surfactants are employed in lieu of Triton X-100. In certain embodiments, the one or more additional/differing surfactants are selected from the group consisting of branched and unbranched alcohol ethoxylates, alkylphenol ethoxylates (e.g. octylphenol ethoxylates), ethylene oxide-propylene oxide diblock and triblock copolymers (e.g. BASF Pluronic Surfactants) or blends thereof. In certain embodiments, Applicant has discovered that the amphiphile should have an ethylene oxide repeat unit $(EO)_n$, whereby n is less than or equal to about 200 (n moles of ethoxylation). Triton X-100 reportedly has a value for n of about nine (9).

The following example is presented to further illustrate to persons skilled in the art how to make and use the invention. This example is not intended as a limitation, however, upon the scope of the invention.

Example I

About 5 grams of Applicant's aqueous coating composition is initially prepared as an aqueous (or semi-aqueous alcoholic) mixture containing about 0.1 weight percent Chloroaluminum Phthalocyanine photocatalyst (A-13Y Sanyo Color Works, Ltd. Japan), an emulsifier comprising 0.1 weight percent Triton X-100 Ethoxylated Octylphenol Surfactant (9.5 mole EO Ethoxylation Content: Dow Chemical Corporation), a binder comprising 0.6 g 3-Glycidoxypropyltrimethoxysilane (Silquest A-187 Organosilane Ester monomer Momentive Performance Materials, Inc.), and 0.1 g Calcium acetate Hydrate $Ca(OAc)_2$ (Reagent Grade, Sigma Aldrich Chemical Company) diluted w/Distilled $H_2O$ to 10 g Final Solution Mass. (The final AlPc photosensitizer concentration within the coating solution was 0.05 wt %.).

In Example I, Applicant's coating composition comprises the photocatalyst at about 0.05 weight percent, the emulsifier at about 0.05 weight percent, the organosilane binder at about 6 weight percent, and the calcium salt at about 0.05 weight percent.

In Example I, calcium propionate electrolyte promotes ethylene oxide surfactant self-assembly. In other embodiments, other calcium electrolytes are employed, including calcium lactate, gluconate, salicylate, hydroxyacetate, acetate, succinate, maleate, calcium acetate, calcium carbonate, calcium chloride, calcium formate, and adipate.

In Example I, the organosilane binder is hydrolyzed glycidoxypropyltrimethoxysilane (or glycidoxypropytriethoxysilane). In other embodiments, other organosilane esters are utilized. In certain embodiments, various soluble silicates (PQ Corporation Valley Forge, Pa.) are used as binders alone or in combination with hydrolyzed organosilane esters including potassium silicate, lithium silicate, sodium silicate, guanidium silicate, polyalkylguanidinium silicate, tetraalkylammonium silicate or blends thereof. An attractive feature of soluble silicates is that they are GRAS—Generally Regarded As Safe materials and enable formulation of essentially zero VOC emission coatings.

In certain embodiments, urethane emulsions may also be utilized as a binder, either alone or in combination with the aforementioned binders. Applicant has found that polyurethanes impart toughness to the coating.

The solution was then disposed upon Kappler PROVENT 10,000 nonwoven spunbonded polyolefin protective garment fabric (Kappler, Inc. Guntersville, Ala.) followed by drying within a convection oven at 85 degrees Celsius for 30 minutes.

The coated fabric was then challenged with neat droplets of 2-chloroethyl ethylsulfide (CEES) HD chemical warfare agent simulant followed by irradiation using an Oriel Solar Simulation Lamp outfitted with a hot mirror (filter out incident infrared radiation). A detailed discussion of the CEES sample challenge procedure is provided below.

In certain embodiments, other ethoxylated materials (e.g. BASF Chemicals Pluronic diblock or triblock polyethyleneoxide-polypropyleneoxide surfactants, ethoxylated fatty alkyl and alkenyl ether or ester surfactants, ethoxylated cationic, anionic or betaines, high molecular weight polymers having ethyoxylated monomer segments etc.) can be used in combination or without Triton X-100 alkyl phenol ethoxylated surfactant. In certain embodiments, addition polymerizable monomers, especially ethoxylated derivatives: ethoxylated acrylates, ethoxylated methacrylates, ethoxylated styrenic derivatives, may also be used to prepare these coatings with or without above listed ethoxylated amphipiles.

In certain embodiments, Applicant's coating composition further comprises one or more polyalkyl glucoside 1 surfactants with or without one or more polyethylene oxide repeat units. Applicant has found that the plurality of pendent hydroxyl groups on the polyalkyl glucoside compound effectively solvates one or more calcium cations, thereby stabilizing surfactant self-assembly and emulsification of highly a hydrophobic photocatalyst. In certain embodiments, m is between 1 and about 100.

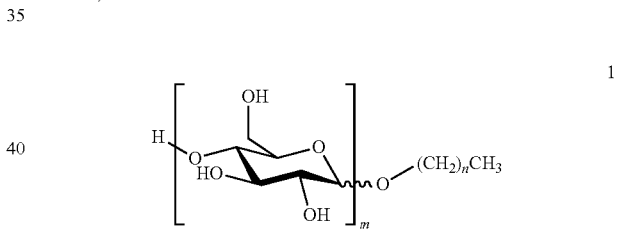

Applicant has discovered that use of such ethoxylated materials, in combination with one or more Group II Periodic Table salts, and in further combination with a singlet oxygen generating photosensitizer, (e.g. phthalocyanine derivative, porphyrin derivative, fullerene, and the like, provides an optimal coating composition.

CEES Challenge Procedure

Photosensitizer treated fabrics were tested for singlet oxygen decontaminant production through the exposure to simulant chemical warfare agents. This procedure included the application of 5.0 µL of 2-Chloroethyl ethyl sulfide (CEES) followed by a 30 minute irradiation in a sealed glass jar using a 150 W Xenon Solar Simulation Lamp (Oriel Instruments) equipped with hot mirror (filter out incident infrared radiation) as well as a Newport FSQ-GG495 Colored Glass Filter to simulate natural sunlight exposure. The sample was placed at an appropriate distance (approximately 36 inches) from the light source in order to produce a light intensity of 100,000±1000 lux within the test chamber. After irradiation for a period of 30 minutes the sample was removed from the test area and 5.0 µL of DMSO was added to the fabric to serve as a standard reference. The jar was resealed and allowed to rest for 2 minutes. The fabric was then treated with 10 mL of reagent grade acetone solvent followed by agitation for 5 minutes using a vortex mixer.

A 1.0 µL of the acetone wash solution was removed from the sample jar and injected into the Shimadzu Scientific Model #QP 2010S GC-MS Instrument outfitted with a Restek 30 meter, 0.25 mm ID Capillary Column to separate and analyze the photodecontamination reaction products present within the wash solution. Comparison was made between the relative peak areas of the DMSO internal quantitation standard, residual CEES, and oxidized decontamination reaction products to monitor the surface reactivity of candidate photosensitizer treated fabric samples. The GC MS instrument was calibrated in accordance with the EPA 525.2 Method Determination of Organic Compounds In Drinking Water By Liquid-Solid Extraction and Capillary Column Gas Chromatography/Mass Spectrometry using Decafluorotriphenylphosphine (DFPTT) as a reference standard.

Detailed Coated Textile CEES Challenge Instructions

Test Chamber GC/MS Preparation

Calibrate GC/MS instrument using the DFTPP reference with the EPA 525.2 method;
Power on hood and lower sash to maximum safe level;
Power on Xenon 150 W lamp equipped with Newport FSQ-GG 495 nm filter;
Position and power on nearby fan and temperature probe;
Allow lamp to equilibrate (approximately 30-45 minutes);
Adjust positioning of test chamber to ensure a 100,000±1000 lux light intensity within chamber;

Sample Preparation

Insert a 1" by 1" fabric swatch with treated side face up into a 125 mL jar;
Using a calibrated GC syringe, apply ten (10), 0.5 µL drops of CEES to treated surface;
Seal the jar ensuring proper positioning of the Teflon lid liner;
Place sample in testing chamber beginning 30 minute exposure;
Record Starting Room and Cell Temperature, Laboratory Relative Humidity, and Light Intensity;

Sample Processing

Remove jar from testing chamber after elapsed 30 minutes;
Record Final Cell Temperature;

Apply 5 µL of DMSO using DMSO designated GC syringe and reseal;
Allow to set for 2 minutes;
Using volumetric pipet, add 10 mL of Acetone and reseal;
Using vortex mixer set at '3000', shake mixture for 5 minutes;
Using a new disposable pipet, extract Acetone wash and place in labeled test tube;
Using designated CEES GC syringe, extract a 1 µL sample for GC/MS testing;
Decontaminate the sample and jar using bleach solution;
Run the sample through the GC/MS utilizing the 'PROVENT' method file;
Analyze/Quantify CEES conversion through relative peak areas.

Figure 2:
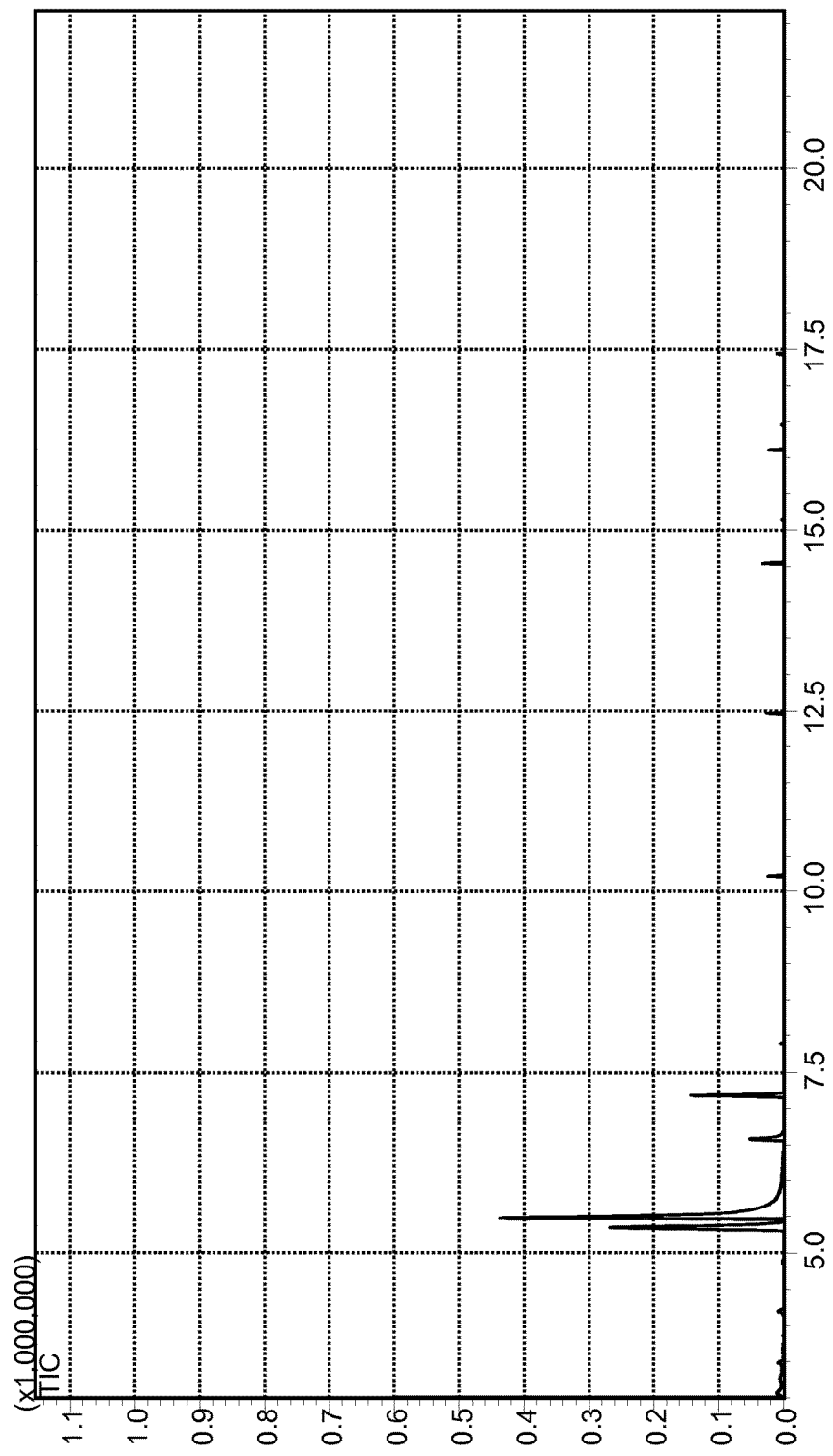
FIG. 2 recites GC MS results for CEES control.

FIG. 2 recites GC MS data for the CEES compound alone. FIG. 1 recites GC MS results from CEES Challenge upon PROVENT fabric coated with Applicant's aqueous self-decontaminating formulation of Example 1. Table 1 summarizes the results recited in FIG. 1

TABLE 1

| Retention Time (min) | start | end | m/z | Area | Area % | Height | Height % | A/H |
|---|---|---|---|---|---|---|---|---|
| 5.265 | 5.250 | 5.345 | TIC | 15103 | 2.09 | 2977 | 1.16 | 5.07 |
| 5.374 | 5.345 | 5.450 | TIC | 84255 | 11.65 | 32420 | 12.58 | 2.59 |
| 5.561 | 5.545 | 5.750 | TIC | 290065 | 40.12 | 54827 | 21.28 | 5.29 |
| 11.125 | 11.095 | 11.220 | TIC | 258258 | 35.72 | 122736 | 47.65 | 2.10 |
| 11.401 | 11.365 | 11.455 | TIC | 75314 | 10.42 | 44653 | 17.33 | 1.68 |

As can be seen from FIG. 1, there is no CEES peak present at circa 7.2 minute retention time (rt) coupled with the presence of proportionately large sized oxidized CEES by-product peaks indicating that essentially 100% of the initial CEES challenge was oxidized/decontaminated by the fabric treated with the aqueous self-decontamination formulation. Table 2 summarizes the retention times for the CEES compound and for the oxidation products from the CEES compound.

TABLE 2

| GC MS Peak | Retention Time (minutes) |
|---|---|
| DMSO Internal Standard | 5.4-5.6 |
| CEES HD CW Simulant | ~7.2 |
| Decontaminated CEES sulfoxide | ~11.1 |
| Decontaminated CEES sulfone | ~11.4 |

Example 2

Figure 3:
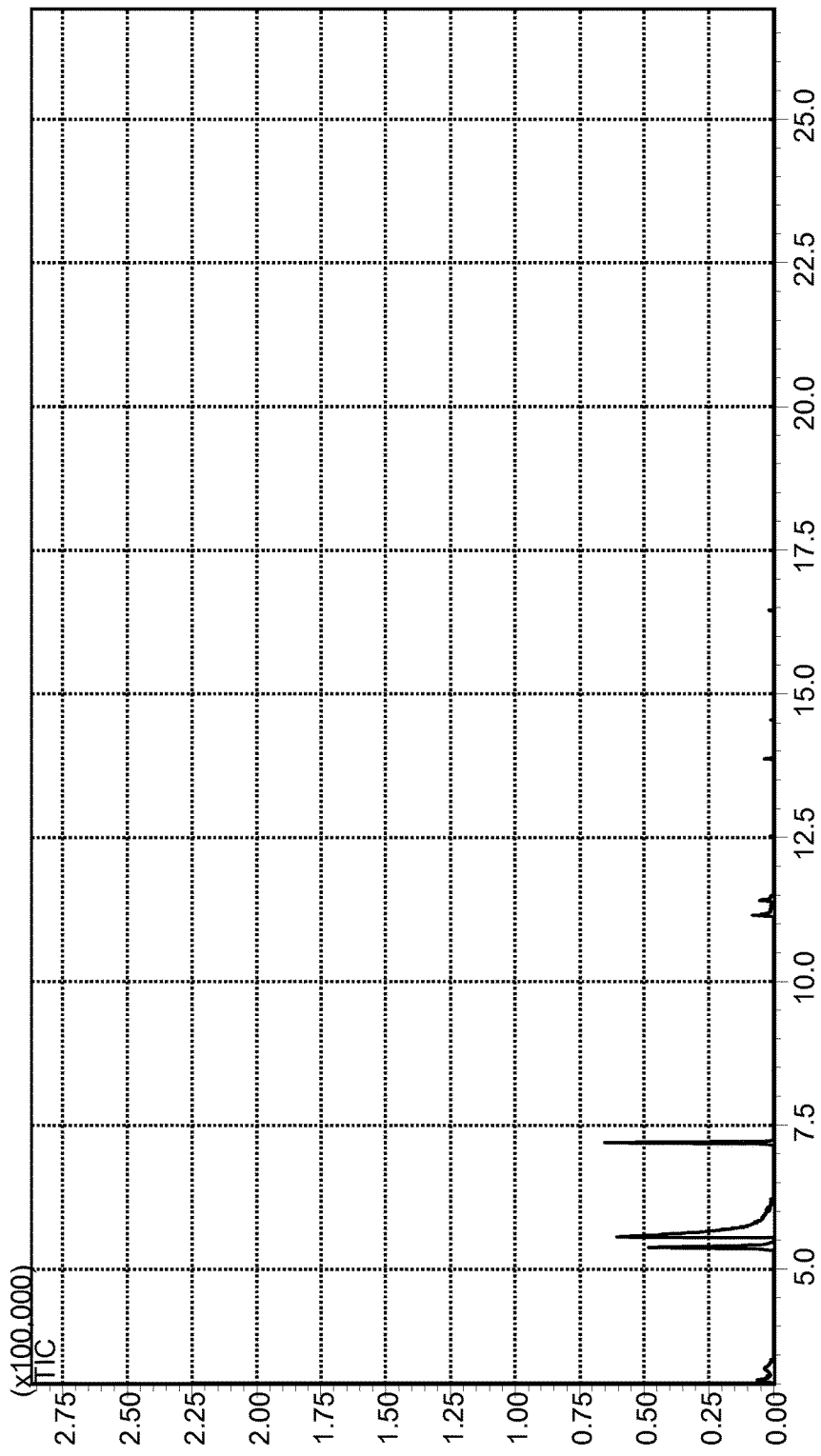
FIG. 3 recites GC MS results for Example 2.

FIG. 3 recites GC MS data for CEES-testing of a fabric coated with a coating composition comprising AlPc at 0.01 weight percent and A-187 at six weight percent, but did not include Calcium Acetate. Table 3 summarizes the data recited in FIG. 3.

TABLE 3

| rt | start | end | m/z | area | area % | height | height % | A/H |
|---|---|---|---|---|---|---|---|---|
| 3.056 | 3.015 | 3.100 | TIC | 14858 | 2.37 | 5217 | 2.84 | 2.84 |
| 5.376 | 5.325 | 5.465 | TIC | 123955 | 19.79 | 48327 | 26.28 | 2.56 |

TABLE 3-continued

| rt | start | end | m/z | area | area % | height | height % | A/H |
|---|---|---|---|---|---|---|---|---|
| 5.561 | 5.545 | 5.785 | TIC | 369490 | 58.98 | 60265 | 32.77 | 6.13 |
| 7.193 | 7.155 | 7.235 | TIC | 108958 | 17.39 | 65197 | 35.44 | 1.67 |
| 11.411 | 11.380 | 11.455 | TIC | 9217 | 1.47 | 4904 | 2.67 | 1.87 |

The data of FIG. 3 and Table 3 shows a CEES oxidative conversion of about 8%.

Example 3

Figure 4:
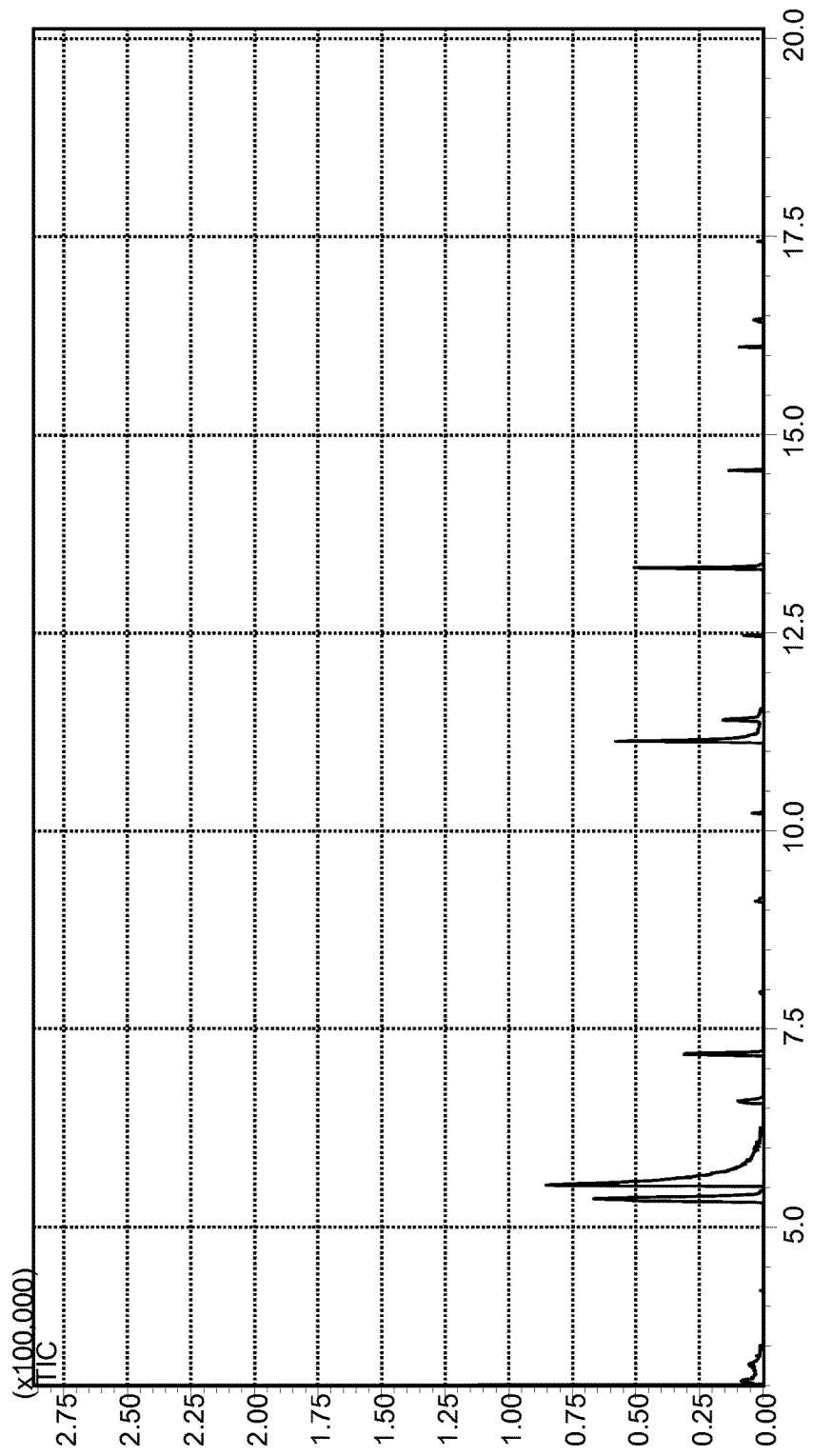
FIG. 4 recites GC MS results for Example 3.

FIG. 4 recites GC MS data for CEES-testing of a fabric coated with a coating composition that included AlPc at 0.01 weight percent, A-187 at six weight percent, and Calcium Acetate at one weight percent. Table 4 summarizes the data recited in FIG. 4.

TABLE 4

| rt | start | end | m/z | area | area % | height | height % | A/H |
|---|---|---|---|---|---|---|---|---|
| 5.362 | 5.310 | 5.425 | TIC | 227075 | 29.15 | 65597 | 21.87 | 3.46 |
| 5.531 | 5.520 | 5.640 | TIC | 279507 | 35.87 | 82825 | 27.62 | 3.37 |
| 7.182 | 7.155 | 7.220 | TIC | 56549 | 7.26 | 30991 | 10.33 | 1.82 |
| 11.132 | 11.105 | 11.195 | TIC | 123065 | 15.80 | 56008 | 18.68 | 2.19 |
| 11.406 | 11.320 | 11.545 | TIC | 26681 | 3.42 | 14476 | 4.83 | 1.84 |
| 13.319 | 13.295 | 13.355 | TIC | 66204 | 8.50 | 49977 | 16.67 | 1.32 |

The data of FIG. 4 and Table 4 shows a CEES oxidative conversion of about 73%.

Example 4

Figure 5:
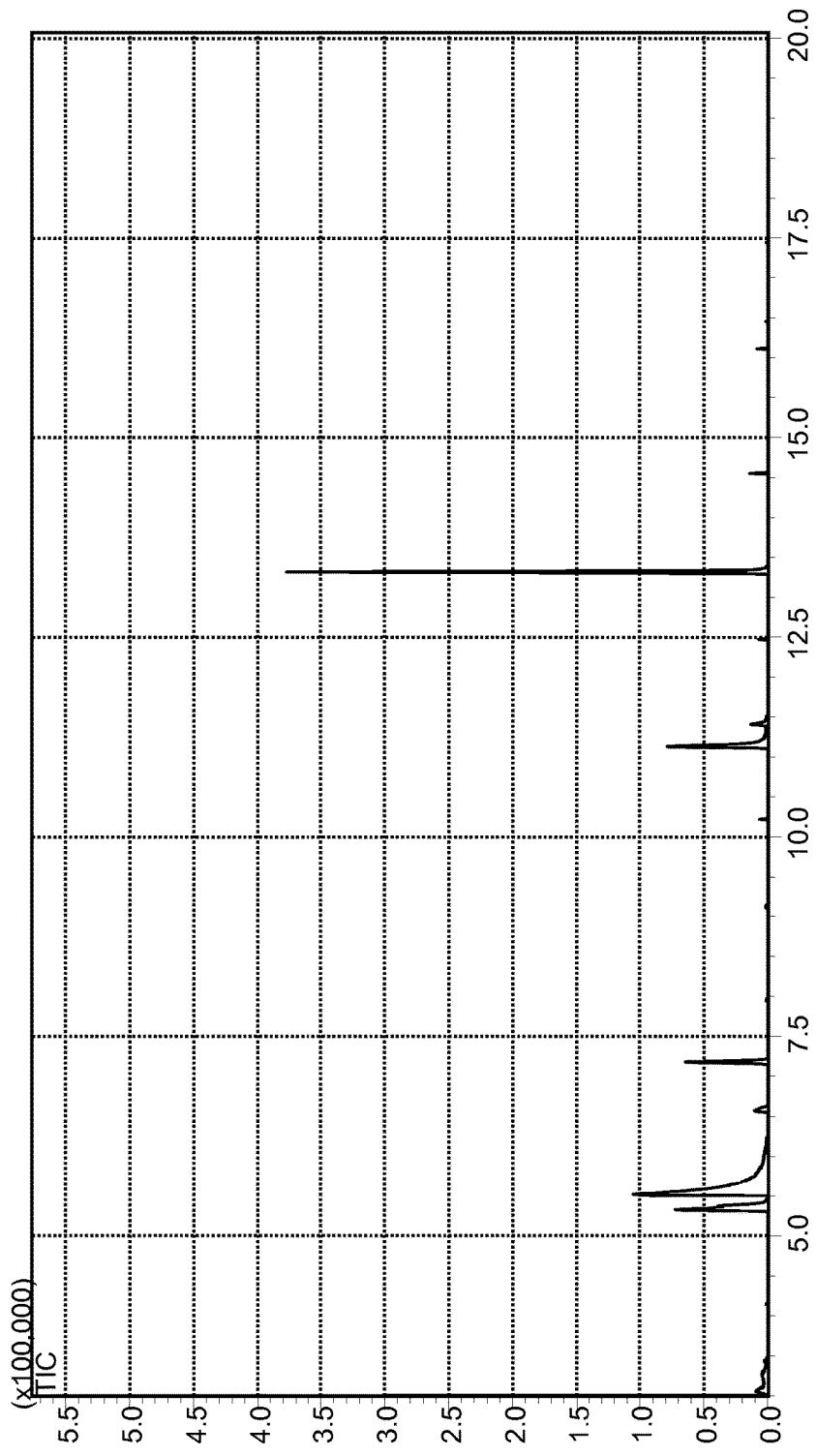
FIG. 5 recites GC MS results for Example 4.

FIG. 5 recites GC MS data for CEES-testing of a fabric coated with a coating composition that included AlPc at 0.01 weight percent, A-187 at six weight percent, and Calcium Acetate at one tenth weight percent. Table 5 summarizes the data recited in FIG. 5.

TABLE 5

| rt | start | end | m/z | area | area % | height | height % | A/H |
|---|---|---|---|---|---|---|---|---|
| 5.329 | 5.300 | 5.360 | TIC | 166480 | 11.41 | 71749 | 10.18 | 2.32 |
| 5.520 | 5.500 | 5.675 | TIC | 476818 | 32.68 | 102913 | 14.60 | 4.63 |
| 7.178 | 7.150 | 7.225 | TIC | 126177 | 8.65 | 64348 | 9.13 | 1.96 |
| 11.133 | 11.100 | 11.200 | TIC | 167792 | 11.50 | 76550 | 10.86 | 2.19 |
| 11.410 | 11.325 | 11.550 | TIC | 24632 | 1.69 | 12508 | 1.77 | 1.97 |
| 13.319 | 13.290 | 13.380 | TIC | 497254 | 34.07 | 376792 | 53.46 | 1.31 |

The data of FIG. 5 and Table 5 shows a CEES oxidative conversion of about 60%.

Example 5

Figure 6:
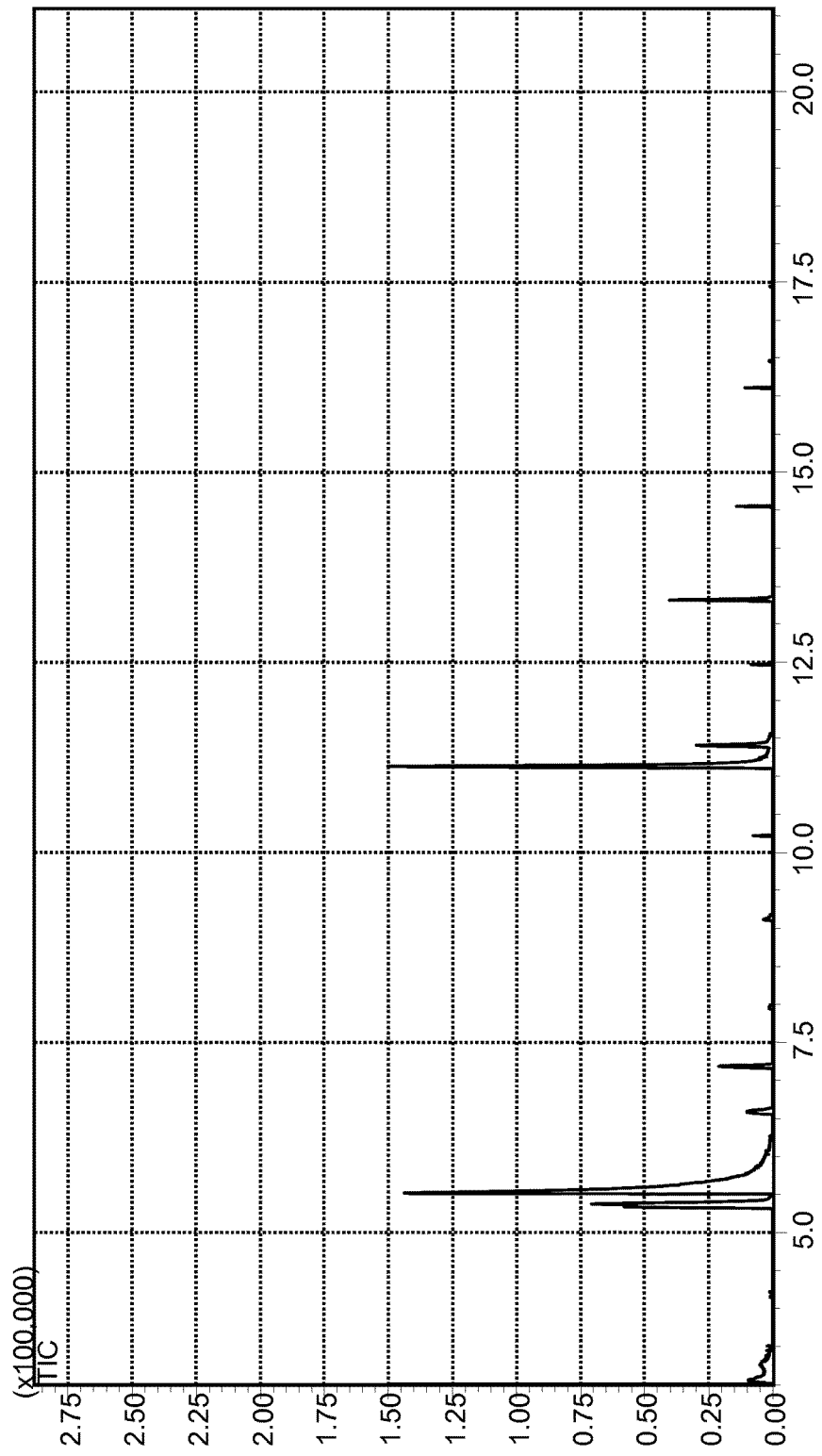
FIG. 6 recites GC MS results for Example 5.

FIG. 6 recites GC MS data for CEES-testing of a fabric coated with a coating composition that included AlPc at 0.01 weight percent, A-187 at six weight percent, and Calcium Acetate at two weight percent. Table 6 summarizes the data recited in FIG. 5.

TABLE 6

| rt | start | end | m/z | area | area % | height | height % | A/H |
|---|---|---|---|---|---|---|---|---|
| 5.335 | 5.310 | 5.355 | TIC | 115406 | 8.72 | 57455 | 11.97 | 2.00 |
| 5.373 | 5.355 | 5.435 | TIC | 156033 | 11.79 | 69519 | 14.49 | 2.24 |
| 5.518 | 5.505 | 5.670 | TIC | 537819 | 40.61 | 141781 | 29.54 | 3.79 |
| 7.190 | 7.045 | 7.340 | TIC | 43823 | 3.31 | 20996 | 4.38 | 2.08 |
| 11.131 | 11.100 | 11.560 | TIC | 420627 | 31.77 | 150174 | 31.29 | 2.80 |
| 11.410 | 11.325 | 11.560 | TIC | 52050 | 4.10 | 28299 | 5.59 | 1.83 |
| 13.321 | 13.300 | 13.360 | TIC | 50244 | 3.80 | 39983 | 8.33 | 1.25 |

The data of FIG. 6 and Table 6 shows a CEES oxidative conversion of about 92%.

Example 6

Figure 7:
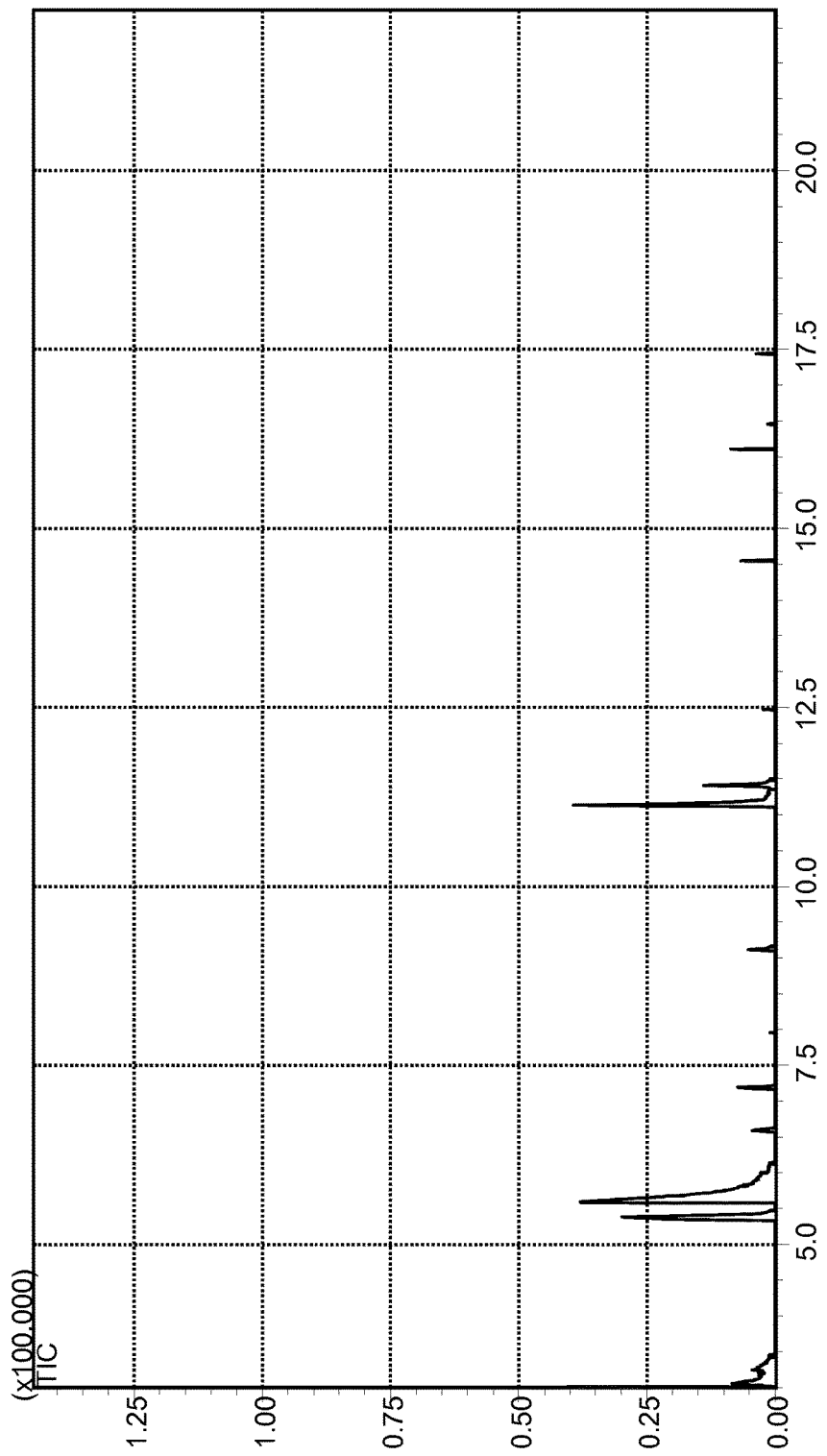
FIG. 7 recites GC MS results for Example 6.

FIG. 7 recites GC MS data for CEES-testing of a fabric coated with a coating composition that included AlPc at 0.02 weight percent, A-187 at six weight percent, and Calcium Acetate at one weight percent. Table 7 summarizes the data recited in FIG. 7.

TABLE 7

| rt | start | end | m/z | area | area % | height | height % | A/H |
|---|---|---|---|---|---|---|---|---|
| 5.379 | 5.325 | 5.455 | TIC | 106895 | 25.19 | 29354 | 23.50 | 3.64 |
| 5.589 | 5.575 | 5.765 | TIC | 198828 | 46.86 | 37492 | 30.01 | 5.30 |

TABLE 7-continued

| rt | start | end | m/z | area | area % | height | height % | A/H |
|---|---|---|---|---|---|---|---|---|
| 7.190 | 7.165 | 7.220 | TIC | 12382 | 2.92 | 6999 | 5.60 | 1.76 |
| 11.139 | 11.110 | 11.205 | TIC | 82429 | 19.42 | 38510 | 30.82 | 2.14 |
| 11.413 | 11.380 | 11.460 | TIC | 23812 | 5.61 | 12579 | 10.07 | 1.89 |

The data of FIG. 7 and Table 7 shows a CEES oxidative conversion of about 90%.

Example 7

Figure 8:
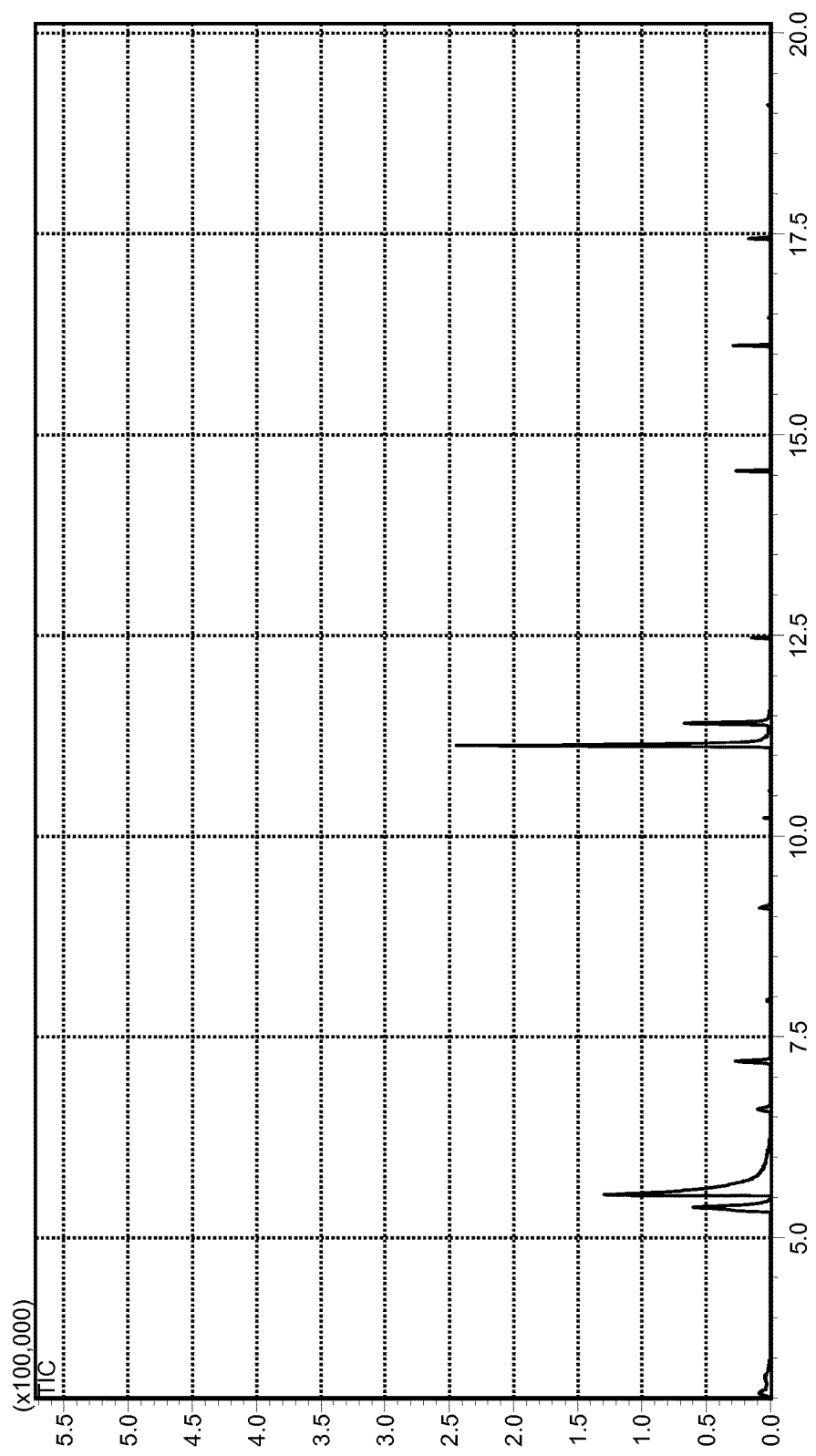
FIG. 8 recites GC MS results for Example 7.

FIG. 8 recites GC MS data for CEES-testing of a fabric coated with a coating composition that included AlPc at 0.02 weight percent, A-187 at six weight percent, and Calcium Acetate at one tenth weight percent. Table 8 summarizes the data recited in FIG. 8.

TABLE 8

| rt | start | end | m/z | area | area % | height | height % | A/H |
|---|---|---|---|---|---|---|---|---|
| 5.378 | 5.315 | 5.455 | TIC | 211797 | 16.28 | 59062 | 11.38 | 3.58 |
| 5.534 | 5.520 | 5.660 | TIC | 463136 | 35.58 | 126054 | 24.29 | 3.67 |
| 7.195 | 7.160 | 7.230 | TIC | 51380 | 3.95 | 26656 | 5.14 | 1.92 |
| 11.130 | 11.095 | 11.205 | TIC | 461681 | 35.48 | 242394 | 46.70 | 1.90 |
| 11.407 | 11.370 | 11.455 | TIC | 113307 | 8.71 | 64826 | 12.49 | 1.74 |

The data of FIG. 8 and Table 8 shows a CEES oxidative conversion of about 92%.

Example 8

Figure 9:
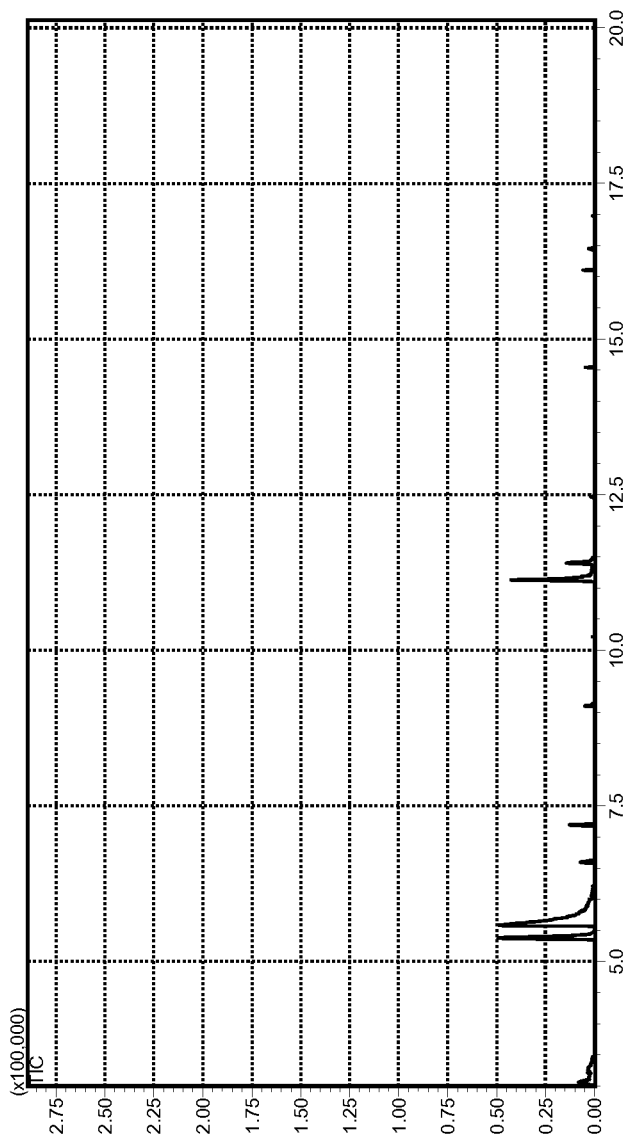
FIG. 9 recites GC MS results for Example 8.

FIG. 9 recites GC MS data for CEES-testing of a fabric coated with a coating composition that included AlPc at 0.02 weight percent, A-187 at six weight percent, and Calcium Acetate at one tenth weight percent. Table 9 summarizes the data recited in FIG. 9.

TABLE 9

| rt | start | end | m/z | area | area % | height | height % | A/H |
|---|---|---|---|---|---|---|---|---|
| 5.377 | 5.350 | 5.455 | TIC | 126709 | 27.27 | 48770 | 29.72 | 2.59 |
| 5.583 | 5.570 | 5.715 | TIC | 204781 | 44.08 | 47680 | 29.06 | 4.29 |
| 7.193 | 7.170 | 7.220 | TIC | 17526 | 3.77 | 13011 | 7.93 | 1.34 |
| 11.128 | 11.100 | 11.200 | TIC | 94855 | 20.42 | 42074 | 25.64 | 2.25 |
| 11.402 | 11.370 | 11.435 | TIC | 20725 | 4.46 | 12558 | 7.65 | 1.65 |

The data of FIG. 9 and Table 9 shows a CEES oxidative conversion of about 87%.

Example 9

Figure 10:
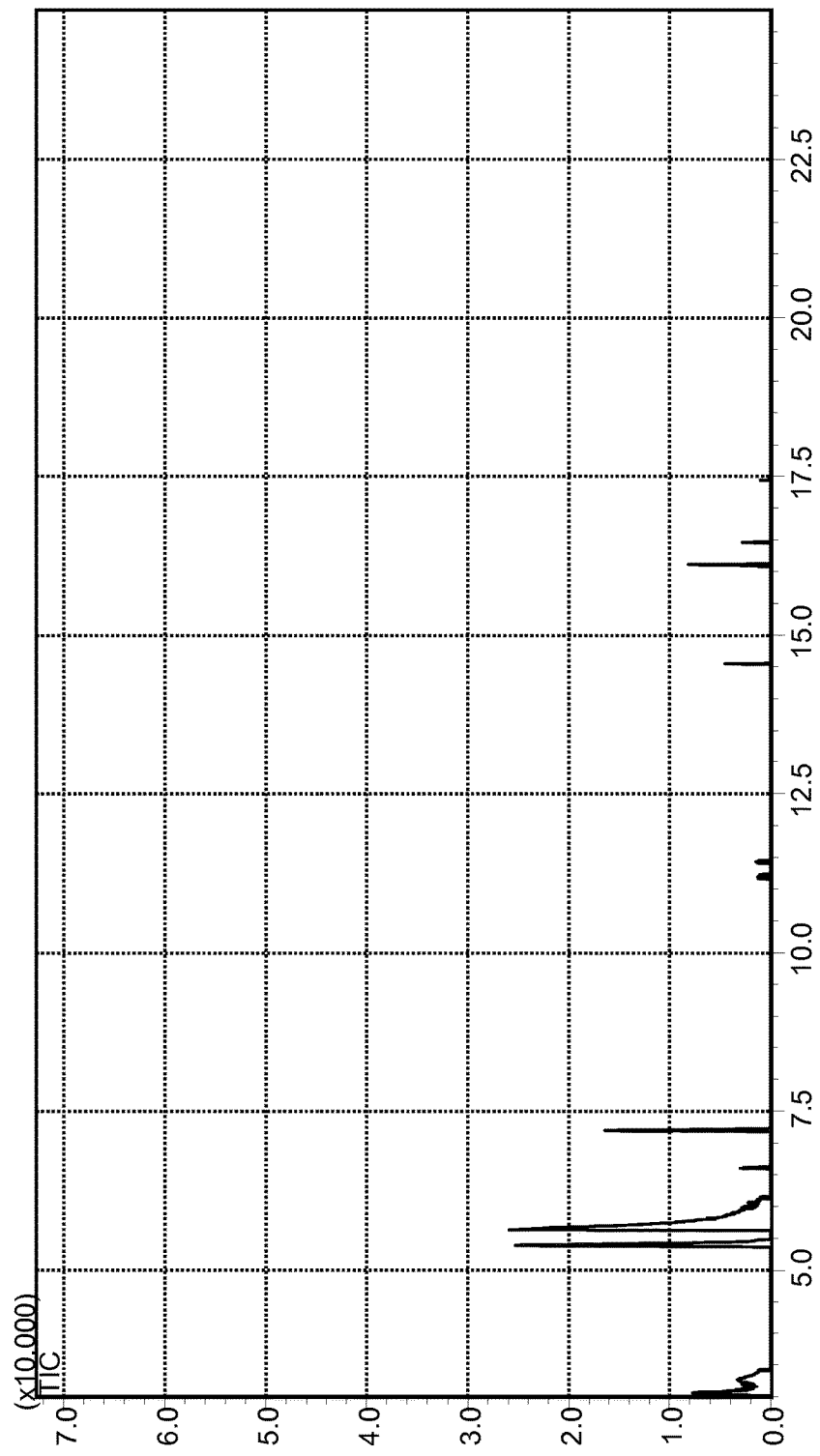
FIG. 10 recites GC MS results for Example 9.

FIG. 10 recites GC MS data for CEES-testing of a fabric coated with a coating composition that included AlPc at 0.02 weight percent, A-187 at zero percent, and Calcium Acetate at one tenth weight percent. Table 10 summarizes the data recited in FIG. 10.

TABLE 10

| rt | start | end | m/z | area | area % | height | height % | A/H |
|---|---|---|---|---|---|---|---|---|
| 5.393 | 5.365 | 5.470 | TIC | 67574 | 32.86 | 24890 | 25.96 | 2.71 |
| 5.640 | 5.625 | 5.660 | TIC | 47716 | 23.20 | 24954 | 26.04 | 1.91 |
| 5.670 | 5.660 | 5.760 | TIC | 54522 | 26.51 | 19252 | 20.08 | 2.83 |
| 7.199 | 7.175 | 7.230 | TIC | 23252 | 11.31 | 16356 | 17.06 | 1.42 |
| 11.187 | 11.015 | 11.335 | TIC | 4057 | 1.97 | 1279 | 1.33 | 3.17 |
| 11.425 | 11.335 | 11.545 | TIC | 3032 | 1.47 | 1457 | 1.52 | 2.08 |
| 16.109 | 16.095 | 16.120 | TIC | 5522 | 2.68 | 7681 | 8.01 | 0.71 |

The data of FIG. 10 and Table 10 shows a CEES oxidative conversion of about 23%.

Example 10

Figure 11:
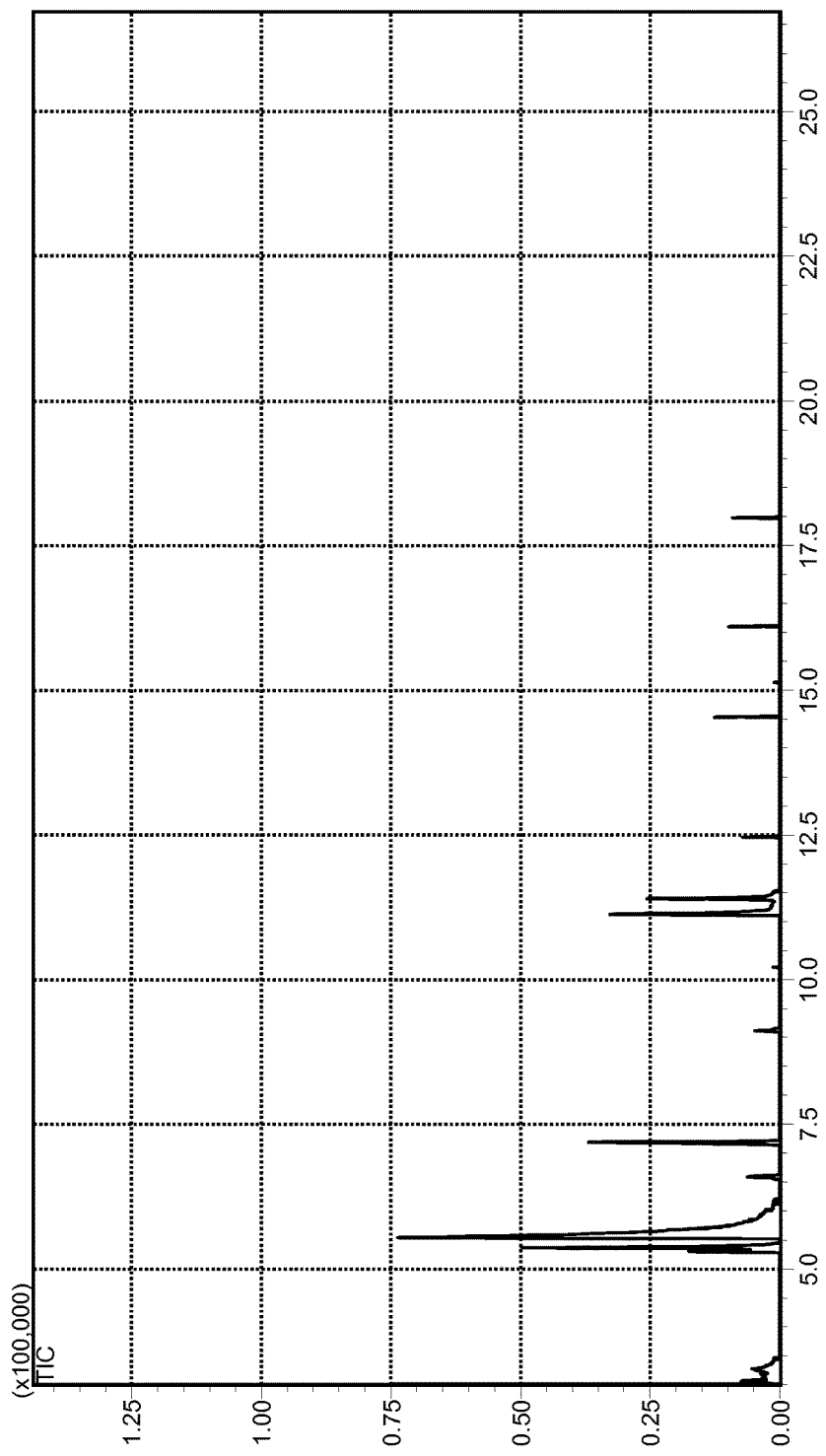
FIG. 11 recites GC MS results for Example 10.
Figure 12A:
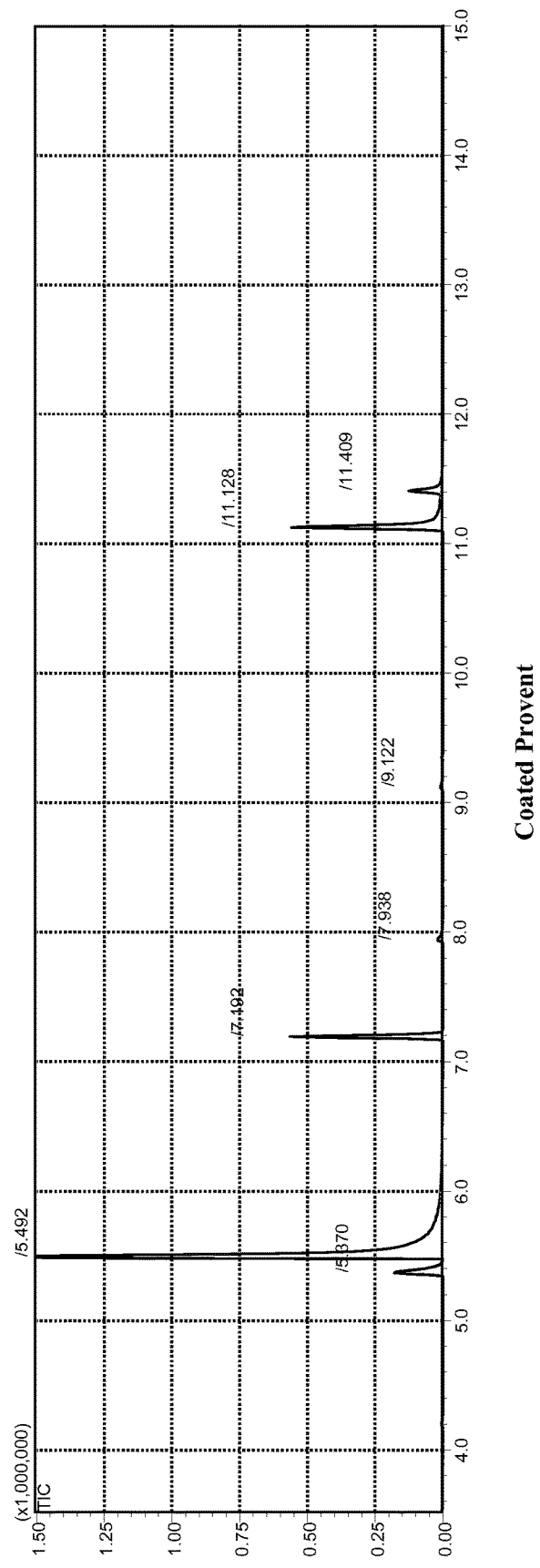
FIGS. 12A-12D recites GC MS results; for Example 11.
Figure 12B:
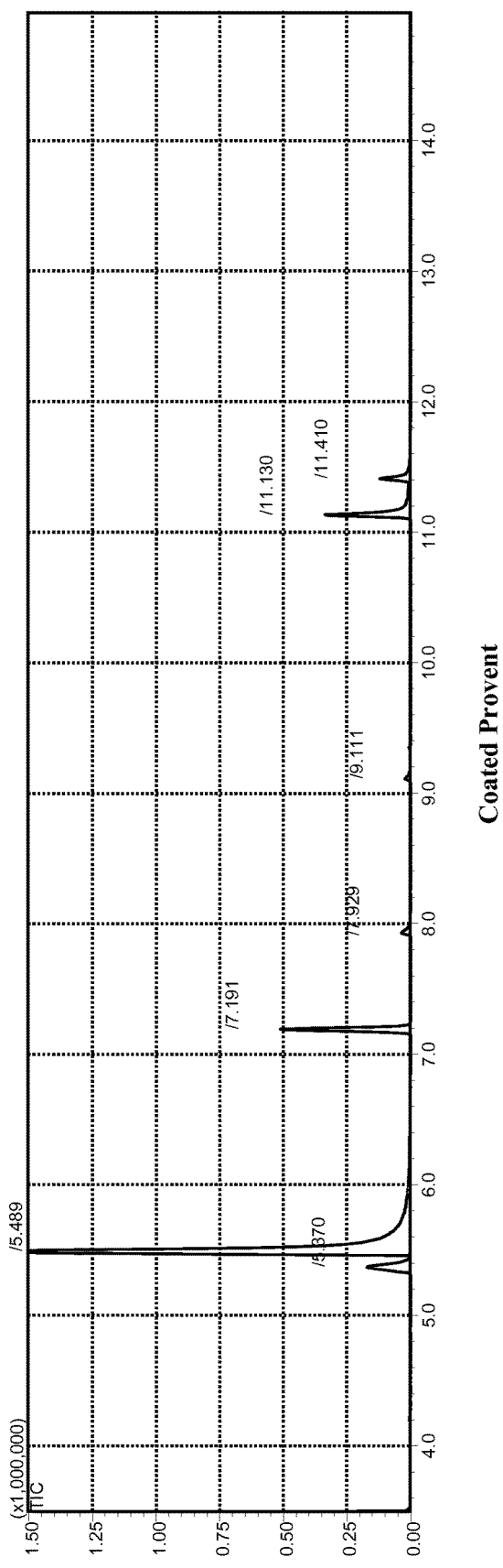
Figure 12C:
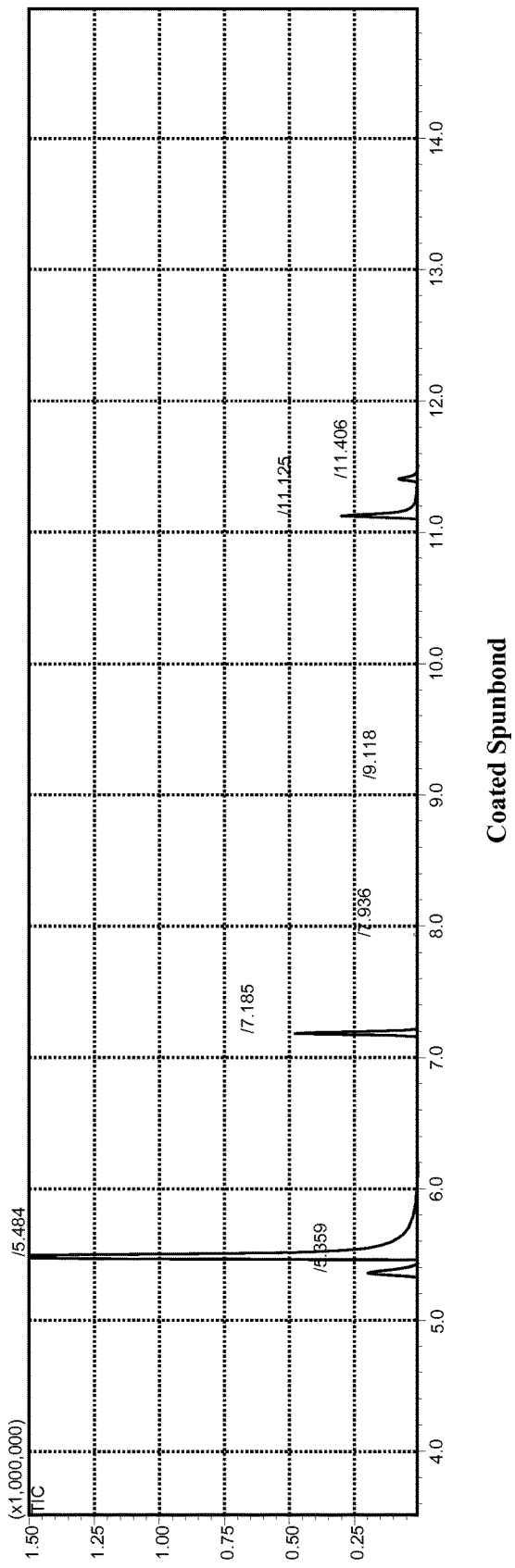
Figure 12D:
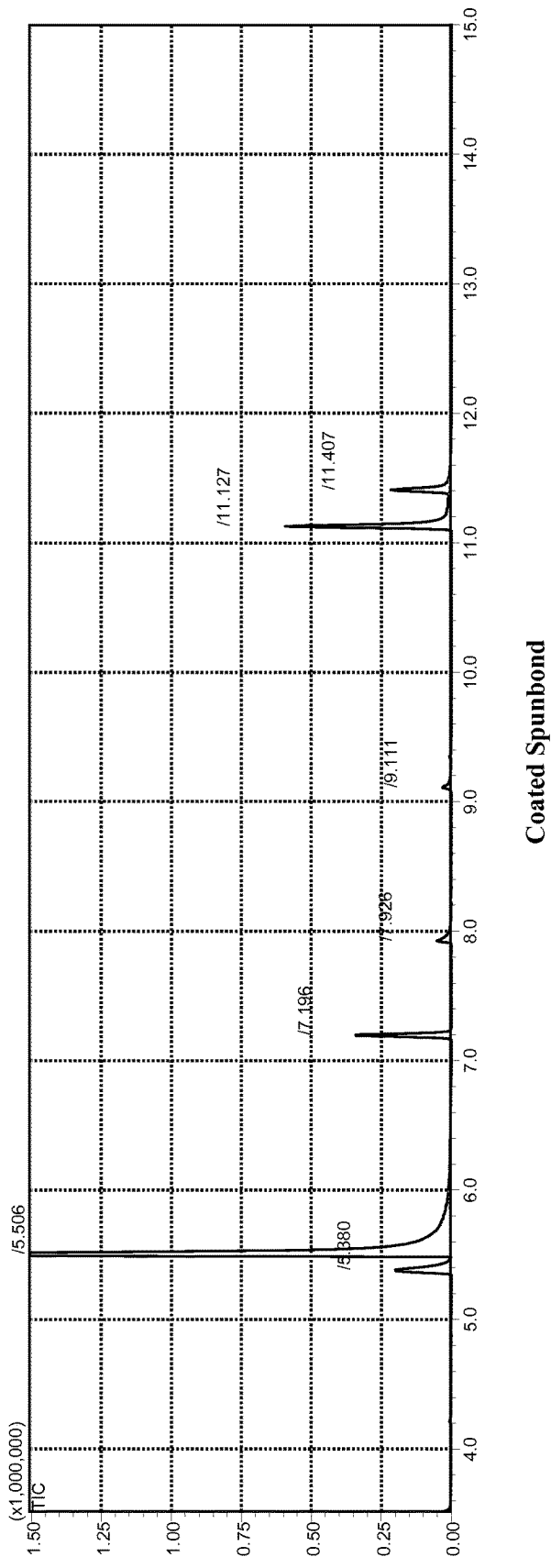

FIG. 11 recites GC MS data for CEES-testing of a fabric coated with a coating composition that included AlPc at 0.05 weight percent, A-187 at six weight percent, and Zinc Acetate at one weight percent. Table 11 summarizes the data recited in FIG. 11.

TABLE 11

| retention time | start | end | m/z | area | area % | height | height % | A/H |
|---|---|---|---|---|---|---|---|---|
| 5.300 | 5.285 | 5.350 | TIC | 39179 | 7.06 | 13864 | 6.21 | 2.82 |
| 5.371 | 5.350 | 5.430 | TIC | 99343 | 17.90 | 48209 | 21.60 | 2.06 |
| 5.546 | 5.530 | 5.645 | TIC | 236669 | 42.63 | 69761 | 31.27 | 3.39 |
| 7.192 | 6.985 | 7.330 | TIC | 69229 | 12.47 | 36889 | 16.53 | 1.87 |
| 11.133 | 11.105 | 11.185 | TIC | 67502 | 12.16 | 30767 | 13.79 | 2.19 |
| 11.402 | 11.370 | 11.445 | TIC | 43198 | 7.78 | 23657 | 10.60 | 1.82 |

The data of FIG. 11 and Table 11 shows a CEES oxidative conversion of about 62%.

Example 11

FIGS. 12A-D show CEES decontamination GC MS results using isopropanol solvent based AlPc photosensitizer coating.

Examples 12-17

Examples 12, 13, 14, and 15, vary the loading of Calcium Acetate in coating compositions comprising 0.03 weight percent AlPc-Cl. Examples 16 and 17 vary the loading of Calcium Acetate in coating compositions comprises 0.05 weight percent AlPc-Cl. Table 12 recites the Sample Coating Emulsion Formulations. Table 13 recites Weight Percent of Each Component per Coating Formulation.

TABLE 12

|  | EX. 12 C1 (g) | EX. 13 C2 (g) | EX. 14 C3 (g) | EX. 15 C4 (g) | EX. 16 K1 (g) | EX. 17 K3 (g) |
|---|---|---|---|---|---|---|
| C Base Emulsion | 10.00 | 10.01 | 10.00 | 10.01 | 0.00 | 0.00 |
| K Base Emulsion | 0.00 | 0.00 | 0.00 | 0.00 | 5.00 | 5.01 |
| water | 7.60 | 7.20 | 6.80 | 6.40 | 3.80 | 3.40 |
| Ca (OAc)$_2$ Sol. | 0.00 | 0.40 | 0.80 | 1.19 | 0.00 | 0.40 |
| A-187 Solution | 2.40 | 2.40 | 2.40 | 2.41 | 1.20 | 1.19 |
| TOTALS | 20.00 | 20.01 | 20.00 | 20.01 | 10.00 | 10.00 |

TABLE 13

|  | EX. 12 C1 | EX. 13 C2 | EX. 14 C3 | EX. 15 C4 | EX. 16 K1 | EX. 17 K3 |
|---|---|---|---|---|---|---|
| AlPc-Cl | 0.03% | 0.03% | 0.03% | 0.03% | 0.05% | 0.05% |
| EtOH | 6.11% | 6.10% | 6.11% | 6.13% | 6.20% | 6.15% |
| Triton X-100 | 0.05% | 0.05% | 0.05% | 0.05% | 0.05% | 0.05% |
| Ca (OAc)$_2$ | 0.00% | 0.50% | 1.00% | 1.49% | 0.00% | 1.00% |
| A-187 Silane | 6.00% | 6.00% | 6.00% | 6.02% | 6.00% | 5.95% |
| water | 87.82% | 87.32% | 86.82% | 86.29% | 87.70% | 86.80% |
|  | 100.00% | 100.00% | 100.00% | 100.00% | 100.00% | 100.00% |

Example 12

Figure 13:
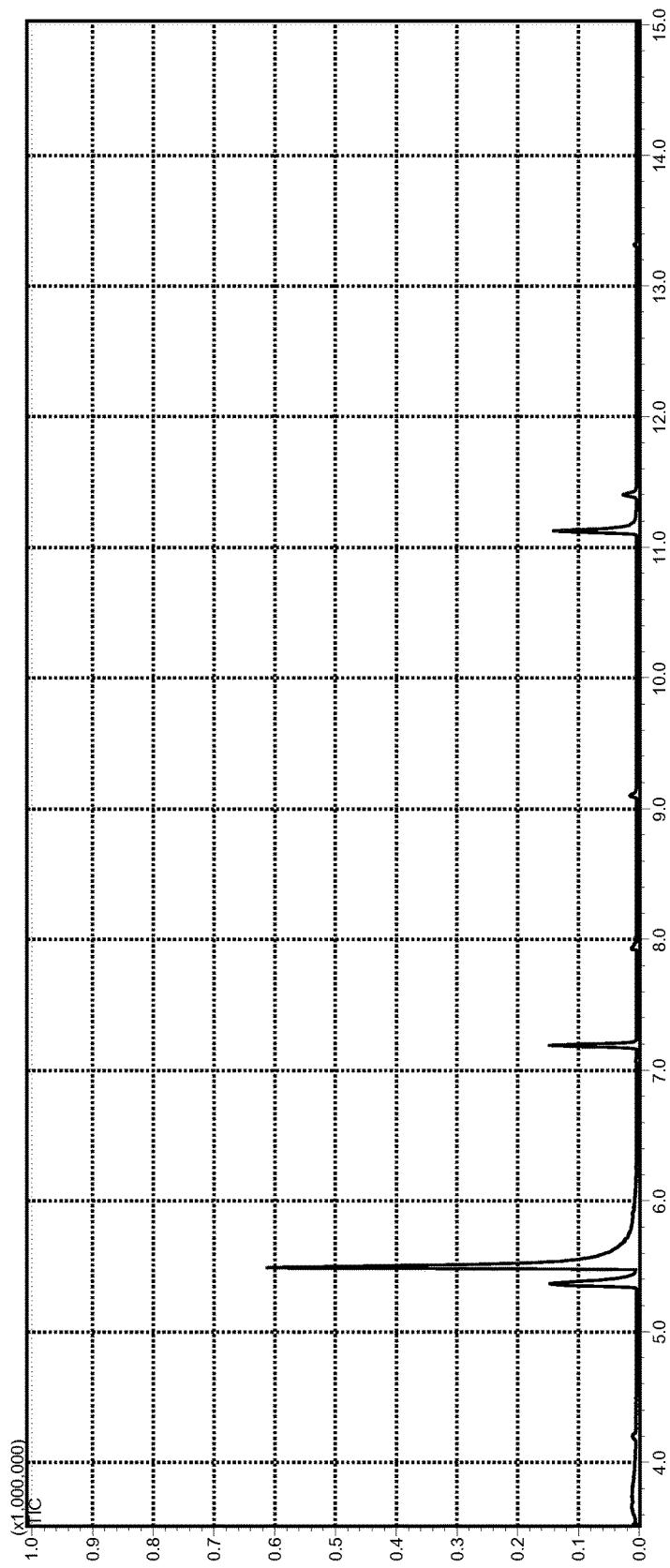
FIG. 13 recites GC MS results for Example 12.

FIG. 13 recites GC MS data for CEES-testing of a fabric prepared using a coating formulation C1. Table 14 summarizes the data recited in FIG. 13.

TABLE 14

| RT | Start | End | m/z | Area | Area % | Height | Height % | A/H |
|---|---|---|---|---|---|---|---|---|
| 5.368 | 5.305 | 5.470 | TIC | 394211 | 14.56 | 141474 | 13.50 | 2.78 |
| 5.491 | 5.455 | 5.995 | TIC | 1784876 | 65.90 | 605728 | 57.82 | 2.94 |
| 7.190 | 7.135 | 7.260 | TIC | 218364 | 8.06 | 143604 | 13.71 | 1.52 |
| 11.125 | 11.065 | 11.240 | TIC | 273957 | 10.12 | 135712 | 12.95 | 2.01 |
| 5.368 | 5.305 | 5.470 | TIC | 394211 | 14.56 | 141474 | 13.50 | 2.78 |

The data of FIG. 13 and Table 14 shows a CEES oxidative conversion of about 75.4%.

Example 13

Figure 14:
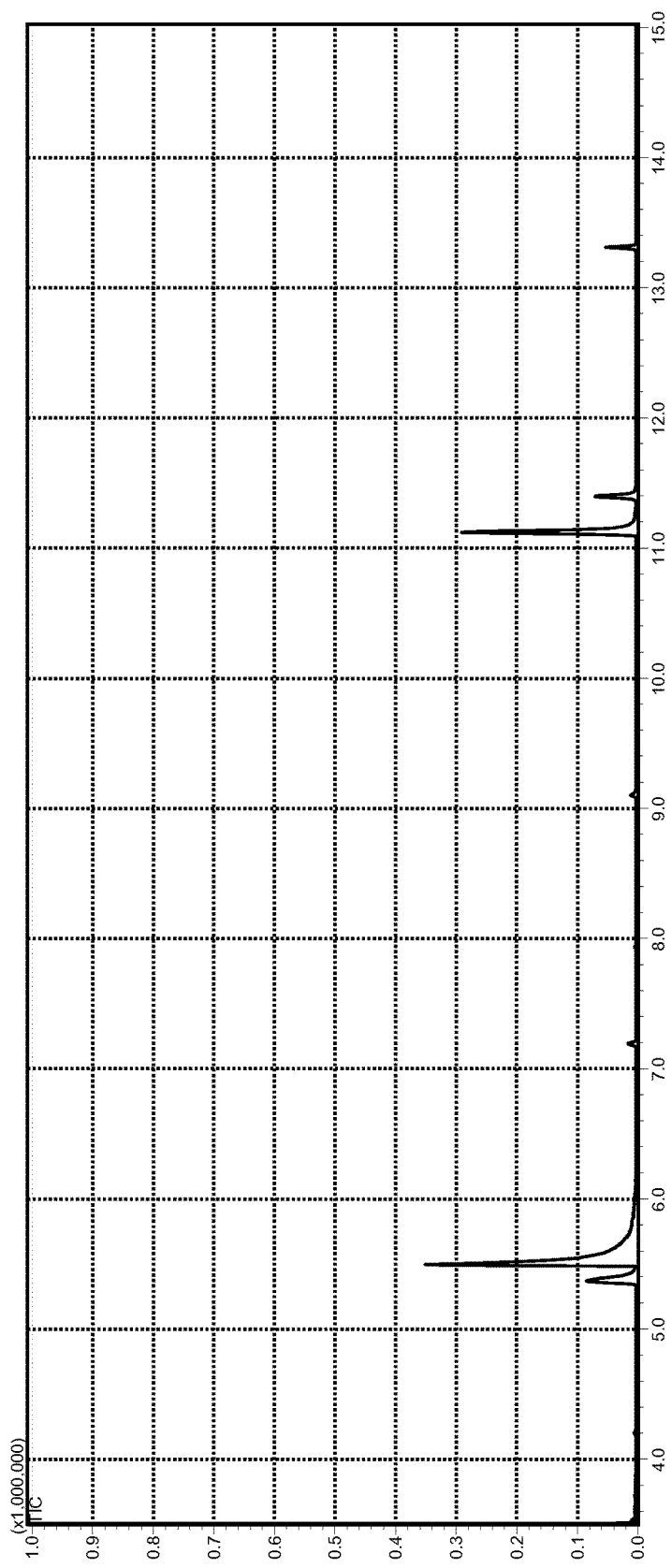
FIG. 14 recites GC MS results for Example 13.

FIG. 14 recites GC MS data for CEES-testing of a fabric prepared using a coating formulation C2. Table 15 summarizes the data recited in FIG. 14.

TABLE 15

| RT | Start | End | m/z | Area | Area % | Height | Height % | A/H |
|---|---|---|---|---|---|---|---|---|
| 5.370 | 5.305 | 5.470 | TIC | 233262 | 10.94 | 80995 | 10.20 | 2.87 |
| 5.496 | 5.455 | 5.995 | TIC | 1202546 | 56.39 | 345524 | 43.50 | 3.48 |
| 7.193 | 7.160 | 7.225 | TIC | 19548 | 0.92 | 13023 | 1.64 | 1.50 |
| 11.122 | 11.045 | 11.310 | TIC | 561127 | 26.32 | 287556 | 36.20 | 1.95 |
| 11.397 | 11.335 | 11.500 | TIC | 115721 | 5.43 | 67195 | 8.46 | 1.72 |

The data of FIG. 14 and Table 15 shows a CEES oxidative conversion of about 97.2%.

Example 14

Figure 15:
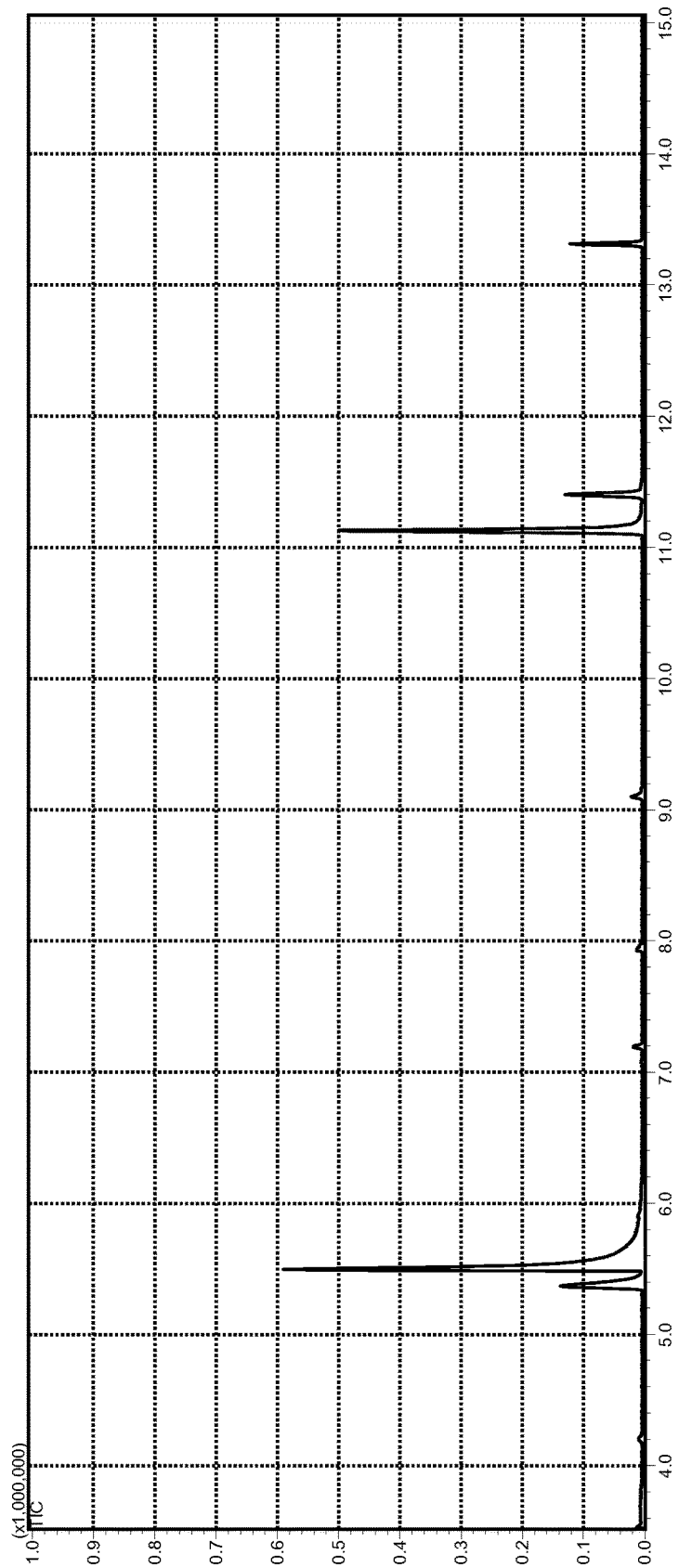
FIG. 15 recites GC MS results for Example 14.

FIG. 15 recites GC MS data for CEES-testing of a fabric prepared using a coating formulation C3. Table 16 summarizes the data recited in FIG. 15.

TABLE 16

| RT | Start | End | m/z | Area | Area % | Height | Height % | A/H |
|---|---|---|---|---|---|---|---|---|
| 5.370 | 5.300 | 5.465 | TIC | 387464 | 11.99 | 132644 | 9.83 | 2.92 |
| 5.496 | 5.450 | 6.005 | TIC | 1704543 | 52.73 | 581472 | 43.10 | 2.93 |
| 7.192 | 7.145 | 7.245 | TIC | 20990 | 0.65 | 14667 | 1.09 | 1.43 |
| 11.128 | 11.040 | 11.275 | TIC | 902583 | 27.92 | 494839 | 36.68 | 1.82 |
| 11.401 | 11.330 | 11.505 | TIC | 216784 | 6.71 | 125439 | 9.30 | 1.72 |

The data of FIG. 15 and Table 16 shows a CEES oxidative conversion of about 98.2%.

Example 15

Figure 16:
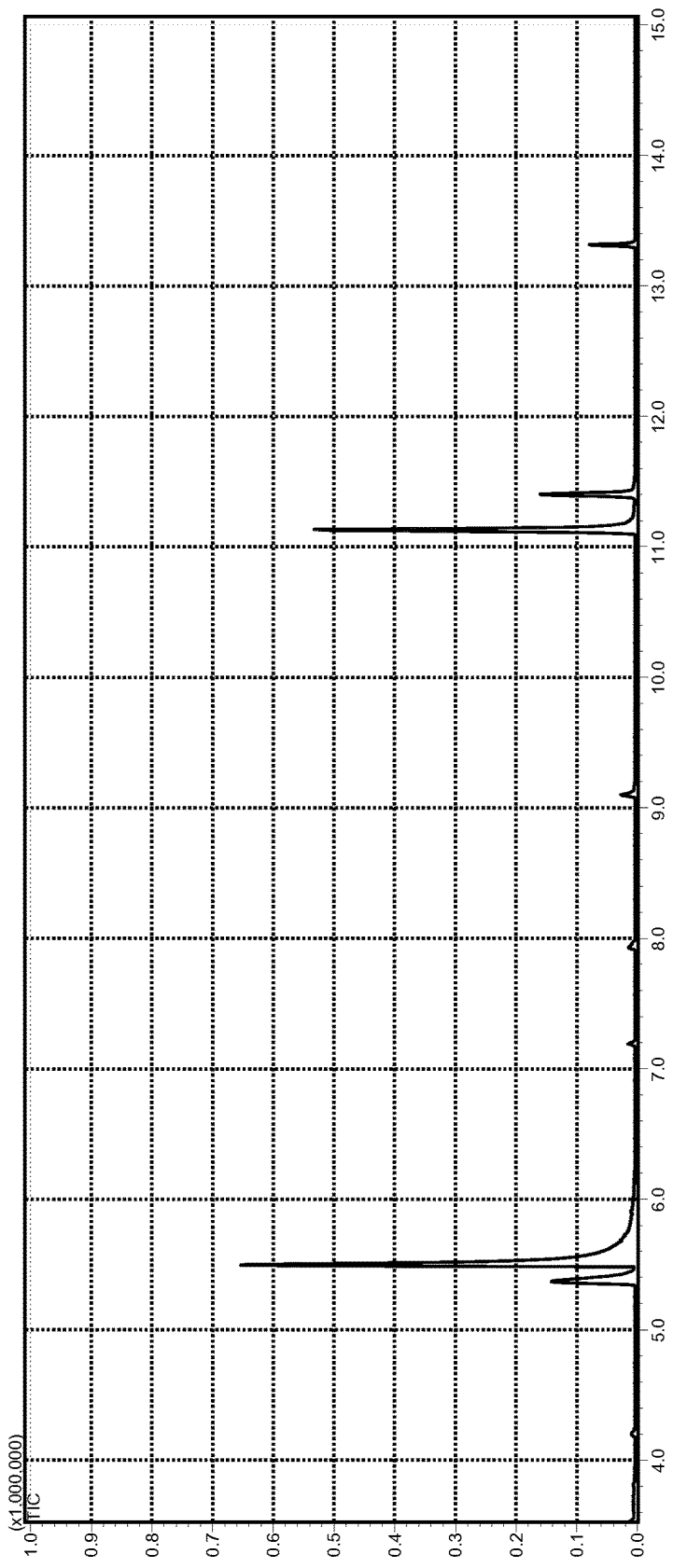
FIG. 16 recites GC MS results for Example 15.

FIG. 16 recites GC MS data for CEES-testing of a fabric prepared using a coating formulation C4. Table 17 summarizes the data recited in FIG. 16.

TABLE 17

| RT | Start | End | m/z | Area | Area % | Height | Height % | A/H |
|---|---|---|---|---|---|---|---|---|
| 5.370 | 5.300 | 5.450 | TIC | 397524 | 11.37 | 135351 | 9.18 | 2.93 |
| 5.497 | 5.450 | 6.000 | TIC | 1853654 | 53.01 | 643774 | 43.65 | 2.87 |
| 7.190 | 7.155 | 7.230 | TIC | 13932 | 0.40 | 11777 | 0.80 | 1.18 |
| 11.129 | 11.060 | 11.310 | TIC | 960943 | 27.48 | 528233 | 35.81 | 1.81 |
| 11.403 | 11.335 | 11.495 | TIC | 270629 | 7.74 | 155783 | 10.56 | 1.73 |

The data of FIG. 16 and Table 17 shows a CEES oxidative conversion of about 98.9%.

Example 16

Figure 17:
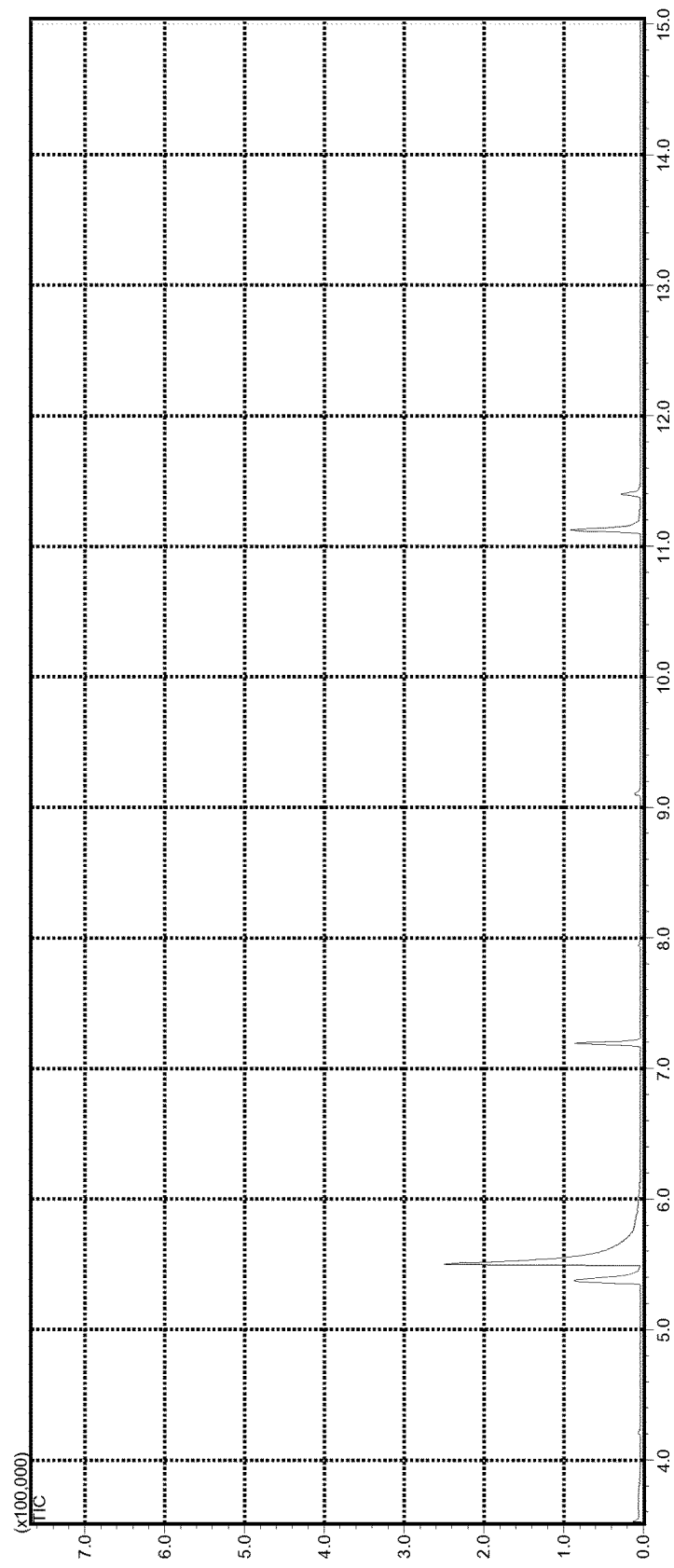
FIG. 17 recites GC MS results for Example 16.

FIG. 17 recites GC MS data for CEES-testing of a fabric prepared using a coating formulation K1. Table 18 summarizes the data recited in FIG. 17.

TABLE 18

| RT | Start | End | m/z | Area | Area % | Height | Height % | A/H |
|---|---|---|---|---|---|---|---|---|
| 5.374 | 5.310 | 5.470 | TIC | 232988 | 14.26 | 82537 | 15.83 | 2.82 |
| 5.502 | 5.470 | 6.010 | TIC | 1048328 | 64.14 | 244952 | 46.98 | 4.27 |
| 7.193 | 7.130 | 7.255 | TIC | 126876 | 7.76 | 82668 | 15.86 | 1.53 |
| 11.124 | 11.045 | 11.270 | TIC | 187568 | 11.48 | 87503 | 16.79 | 2.14 |
| 11.400 | 11.330 | 11.470 | TIC | 38492 | 2.36 | 23650 | 4.54 | 1.62 |

The data of FIG. 17 and Table 18 shows a CEES oxidative conversion of about 64.1%.

Example 17

Figure 18:
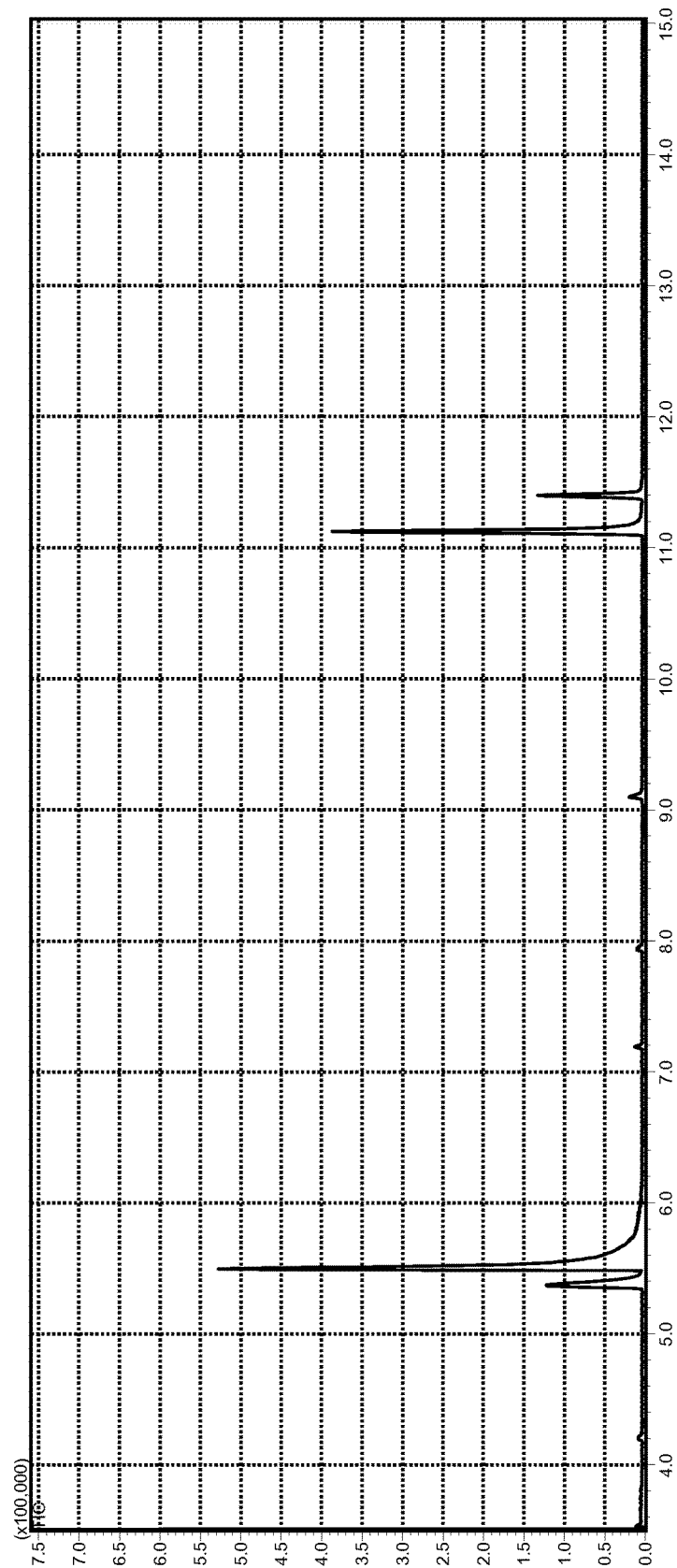
FIG. 18 recites GC MS results for Example 17.

FIG. 18 recites GC MS data for CEES-testing of a fabric prepared using a coating formulation K3. Table 19 summarizes the data recited in FIG. 18.

TABLE 19

| RT | Start | End | m/z | Area | Area % | Height | Height % | A/H |
|---|---|---|---|---|---|---|---|---|
| 5.369 | 5.320 | 5.460 | TIC | 343628 | 12.02 | 117594 | 10.12 | 2.92 |
| 5.496 | 5.470 | 5.985 | TIC | 1572538 | 54.99 | 522429 | 44.99 | 3.01 |
| 7.190 | 7.125 | 7.250 | TIC | 13743 | 0.48 | 9440 | 0.81 | 1.45 |
| 11.125 | 11.055 | 11.320 | TIC | 708087 | 24.76 | 383108 | 32.98 | 1.84 |
| 11.400 | 11.345 | 11.520 | TIC | 221721 | 7.75 | 128914 | 11.10 | 1.71 |

The data of FIG. 18 and Table 19 shows a CEES oxidative conversion of about 98.5%.

There may also be a need to impart antimicrobial and scent/odor eliminating characteristics towards surfaces. Applicant has discovered that the following diol modified guanidinium polymers exhibit remarkable antimicrobial properties. Such guanidinium polymers (structures listed in below figures) have the capability to rapidly kill a wide variety of pathogens (e.g. gram negative/gram positive bacteria, viruses, spores). Such diol moieties can subsequently become crosslinked/condensed with borate, silicates, titanates or zirconates. Given that metabolites from bacteria are often responsible for odor and scent generation, it is possible to combine these polymers with the above detailed Visible Light Activated Aqueous Based Self-Decontaminating Coating Composition to produce a coating having the capacity to decontaminate both toxic chemicals as well as pathogens.

Antimicrobial Guanidinium Polymer Synthesis

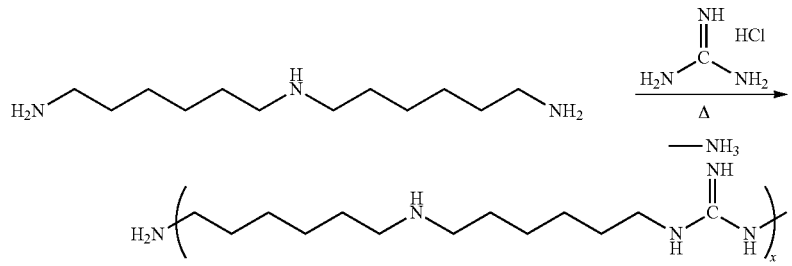

In certain embodiments, x is between about 100 and about 1000.

Glycidol/Diol Modification of Guanidinium Polymer

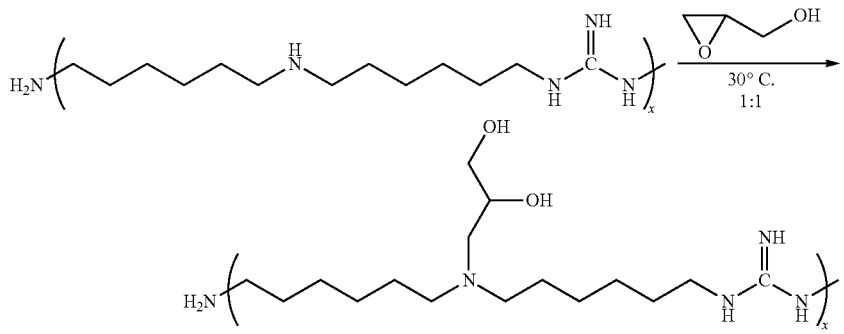

In certain embodiments, x is between about 100 and about 1000.

Furthermore, in certain embodiments these antimicrobial polymeric materials are reacted with glycidol-borate modified polyamines (e.g. branched or straight chain polyethyleneimines, preferably BASF Chemicals Lupasol PEI) to produce compositions which are capable of pathogen detoxification as well as are capable of sequestering odorants. (e.g. carboxylic acids, mercaptan derivatives and the like). These synthesis and chemical structures of these glycidol-borate modified PEI derivatives is presented below.

Glycidol/Diol Modification of Polyethyleneimine

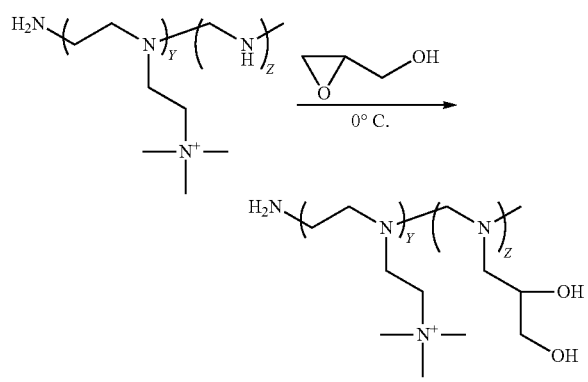

In certain embodiments, Y and Z are each between about 100 and about 1000.

Borate Crosslinking Between Glycidol Alkylated Guanidinium and Guanidinium Polymers

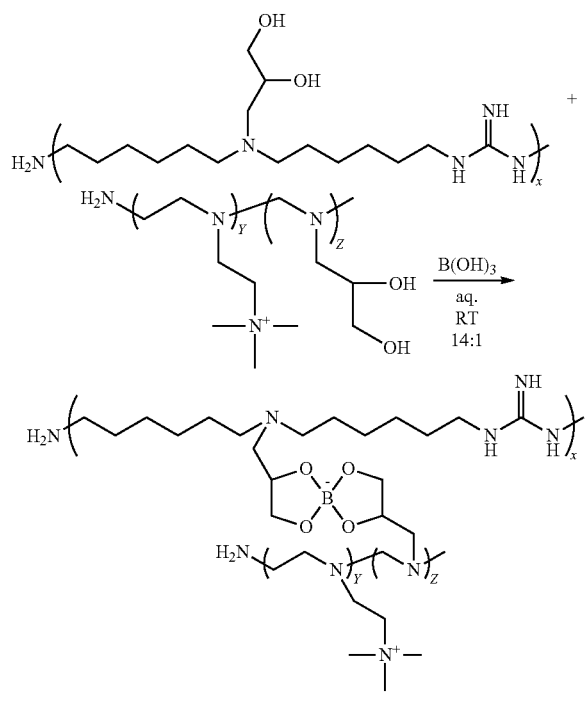

In certain embodiments, X, Y, and Z, are each between about 100 and about 1000.

While the preferred embodiments of the present invention have been illustrated in detail, it should be apparent that modifications and adaptations to those embodiments may occur to one skilled in the art without departing from the scope of the present invention as set forth herein.

I claim:

1. A coating composition, comprising:
   a photocatalyst to generate singlet oxygen when exposed to ambient oxygen and light;
   an emulsifier comprising an polyethylene oxide repeat unit $(EO)_n$, wherein n is less than or equal to about 200, and wherein said emulsifier is selected from the group consisting of branched and unbranched alcohol ethoxylates, alkylphenol ethoxylates, ethylene oxide-propylene oxide diblock and triblock copolymers, and mixtures thereof;
   an organosilane binder; and
   a calcium salt.

2. The coating composition of claim 1, wherein said photocatalyst comprises Chloroaluminum Phthalocyanine.

3. The coating composition of claim 1, wherein said photocatalyst is selected from the group consist of Silicon Phthalocyanine, Zinc Phthalocyanine, un-metalated Phthalocyanine, napthalocyanines, fullerenes, Azure A, Methylene Blue, doped and un-doped titanium dioxide.

4. The coating composition of claim 1, wherein said emulsifier comprises Ethoxylated Octylphenol.

5. The coating composition of claim 1, further comprising a compound having the structure:

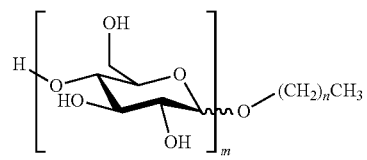

wherein m is between 1 and about 100.

6. The coating composition of claim 1, wherein said organosilane comprises 3-Glycidoxypropyltrimethoxysilane.

7. The coating composition of claim 1, further comprising a polyurethane.

8. The coating composition of claim 1, further comprising a guanidinium polymer comprising a structure:

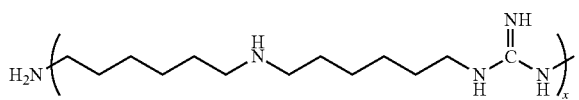

wherein x is between about 100 and about 1000.

9. The coating composition of claim 1, further comprising a guanidinium polymer comprising a structure:

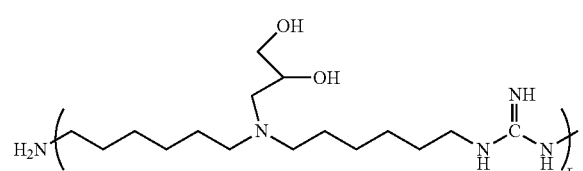

wherein x is between about 100 and about 1000.

10. The coating composition of claim 1, further comprising a polyethyleneimine polymer comprising a structure:

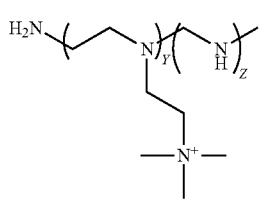
wherein Y and Z are between about 100 and about 1000.
11. The coating composition of claim 1, further comprising a polyethyleneimine polymer comprising a structure:
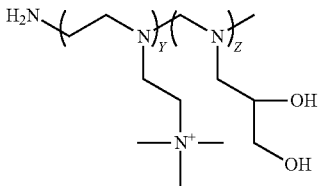
wherein Y and Z are between about 100 and about 1000.
12. The coating composition of claim 1, further comprising a borate ester crosslinked polymeric material comprising a structure:
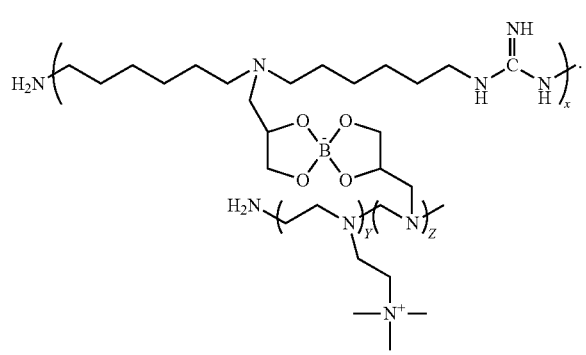
* * * * *